(12) United States Patent
Yang et al.

(10) Patent No.: US 9,240,852 B2
(45) Date of Patent: Jan. 19, 2016

(54) METHOD FOR RECEIVING DOWNLINK CONTROL INFORMATION AND METHOD FOR TRANSMITTING SAME, USER EQUIPMENT AND BASE STATION

(75) Inventors: Suckchel Yang, Anyang-si (KR); Mingyu Kim, Anyang-si (KR); Joonkui Ahn, Anyang-si (KR); Dongyoun Seo, Anyang-si (KR)

(73) Assignee: LG ELECTRONICS INC., Seoul (DE)

( * ) Notice: Subject to any disclaimer, the term of this patent is extended or adjusted under 35 U.S.C. 154(b) by 121 days.

(21) Appl. No.: 14/003,417

(22) PCT Filed: Mar. 9, 2012

(86) PCT No.: PCT/KR2012/001753
§ 371 (c)(1),
(2), (4) Date: Sep. 5, 2013

(87) PCT Pub. No.: WO2012/124942
PCT Pub. Date: Sep. 20, 2012

(65) Prior Publication Data
US 2013/0343242 A1     Dec. 26, 2013

Related U.S. Application Data

(60) Provisional application No. 61/451,598, filed on Mar. 11, 2011, provisional application No. 61/451,597, filed on Mar. 11, 2011, provisional application No. 61/454,575, filed on Mar. 21, 2011, provisional application No. 61/454,576, filed on Mar. 21, 2011.

(51) Int. Cl.
*H04J 3/16* (2006.01)
*H04L 5/00* (2006.01)
*H04W 72/04* (2009.01)

(52) U.S. Cl.
CPC .............. *H04J 3/1694* (2013.01); *H04L 5/001* (2013.01); *H04L 5/0053* (2013.01); *H04L 5/0055* (2013.01); *H04W 72/042* (2013.01)

(58) Field of Classification Search
None
See application file for complete search history.

(56) References Cited

U.S. PATENT DOCUMENTS

2011/0176461 A1*  7/2011  Astely et al. .................. 370/280
2011/0211503 A1*  9/2011  Che et al. ...................... 370/280

FOREIGN PATENT DOCUMENTS

| KR | 10-2010-0075378 A | 7/2010 |
| KR | 10-2010-0113040 A | 10/2010 |
| KR | 10-20100123647 A | 11/2010 |

OTHER PUBLICATIONS

PCT International Application No. PCT/KR2012/001753, Written Opinion of the International Searching Authority dated Sep. 25, 2012, 16 pages.

* cited by examiner

*Primary Examiner* — Diane Lo
(74) *Attorney, Agent, or Firm* — Lee, Hong, Degerman, Kang & Waimey

(57) ABSTRACT

The present invention relates to a wireless communication system. More particularly, the present invention, when cells each operating in different TDD DL-UL configurations are merged, provides a plan for setting a UL grant transmission/reception timing for a cross-CC scheduling. In addition, the present invention, according to the UL grant timing, provides a base station for transmitting UL grant to a user equipment, and a user equipment for receiving the UL grant from the base station.

14 Claims, 15 Drawing Sheets

METHOD FOR RECEIVING DOWNLINK CONTROL INFORMATION AND METHOD FOR TRANSMITTING SAME, USER EQUIPMENT AND BASE STATION

CROSS-REFERENCE TO RELATED APPLICATIONS

This application is the National Stage filing under 35 U.S.C. 371 of International Application No. PCT/KR2012/001753, filed on Mar. 9, 2012, which claims the benefit of U.S. Provisional Application Ser. Nos. 61/451,598, filed on Mar. 11, 2011, 61/451,597, filed on Mar. 11, 2011, 61/454,575, filed on Mar. 21, 2011, and 61/454,576, filed on Mar. 21, 2011, the contents of which are all hereby incorporated by reference herein in their entirety.

TECHNICAL FIELD

The present invention relates to a wireless communication system. Particularly, the present invention relates a method and apparatus for transmitting/receiving an ACK/NACK signal and a method and apparatus for transmitting/receiving a uplink (UL) grant for UL data scheduling.

BACKGROUND ART

A general wireless communication system transmits/receives data through one downlink (DL) band and through one uplink (UL) band corresponding to the DL band (in case of Frequency Division Duplex (FDD) mode), or divides a prescribed radio frame into UL time unit(s) and DL time unit(s) in a time domain and transmits/receives data through the UL/DL time unit(s) (in case of Time Division Duplex (TDD) mode). A Base Station (BS) and a User Equipment (UE) transmit and receive data and/or control information scheduled on a prescribed time unit basis, i.e. on a subframe basis. The data is transmitted and received through a data region configured in a UL/DL subframe and the control information is transmitted and received through a control region configured in the UL/DL subframe. To this end, various physical channels carrying radio signals are formed in the UL/DL subframe.

Meanwhile, to use a wider frequency band in a recent wireless communication system, introduction of carrier aggregation (or bandwidth aggregation) technology that uses a wider UL/DL bandwidth by aggregating a plurality of UL/DL frequency blocks has been discussed.

FIG. 1 illustrates an example of performing communication in a multicarrier situation.

A multicarrier system or Carrier Aggregation (CA) system refers to a system using a wide bandwidth by aggregating a plurality of carriers each having a narrower bandwidth than the target bandwidth. The CA system is different from an Orthogonal Frequency Division Multiplexing (OFDM) system in that DL or UL communication is performed using a plurality of carrier frequencies, whereas the OFDM system up-converts a base frequency band, which is divided into a plurality of orthogonal subcarriers, into a single carrier frequency to perform DL or UL communication. When a plurality of carriers each having a narrower bandwidth than a target bandwidth is aggregated, the bandwidth of each of the aggregated carriers may be limited to a bandwidth used in a legacy system in order to ensure backward compatibility with the legacy system. For example, the legacy system supports bandwidths of 1.4, 3, 5, 10, 15, and 20 MHz and the LTE-Advanced (LTE-A) system evolved from the LTE system may support a bandwidth wider than 20 MHz using only bandwidths supported in the LTE system. Alternatively, CA may be supported by defining a new bandwidth irrespective of the bandwidths used in the legacy system. The term multicarrier is used interchangeably with the term Carrier Aggregation (CA) or bandwidth aggregation. Contiguous CA and non-contiguous CA are collectively referred to as CA. For reference, when only one Component Carrier (CC) is used for communication in TDD or when only one UL CC and one DL CC are used for communication in FDD, this corresponds to communication under a single carrier situation (non-CA).

DISCLOSURE

Technical Problem

In multicarrier aggregation in which a plurality of aggregated carriers is used for communication between a BS and a UE, a communication method using a single carrier cannot be applied to communication using multiple carriers. A new communication method suitable for communication using a plurality of carriers while minimizing an effect on a legacy system should be defined.

It will be appreciated by persons skilled in the art that that the technical objects that can be achieved through the present invention are not limited to what has been particularly described hereinabove and other technical objects of the present invention will be more clearly understood from the following detailed description.

Technical Solution

In an aspect of the present invention, provided herein is a method for receiving downlink control information from a base station at a user equipment in which a plurality of cells is configured, including receiving downlink control information for an uplink data channel to be transmitted in an uplink subframe $U_2$ of a second cell among the plurality of cells from the base station in a downlink subframe $D_1$ of a first cell among the plurality of cells; and transmitting the uplink data channel to the base station in the uplink subframe $U_2$ according to the downlink control information, wherein the first cell and the second cell have different time division duplex (TDD) downlink-uplink configurations, and wherein the downlink subframe $D_1$ is a subframe configured for transmission of downlink control information for an uplink subframe $U_1$ of the first cell (where $D_1$, $U_1$, and $U_2$ are non-negative integers), and the uplink subframe $U_1$ is an uplink subframe which is the nearest to the uplink subframe $U_2$ among an uplink subframe of the first cell, which coincides with the uplink subframe $U_2$, and uplink subframes of the first cell, which are prior to the uplink subframe $U_2$.

In another aspect of the present invention, provided herein is a method for transmitting downlink control information at a base station to a user equipment in which a plurality of cells is configured, including transmitting downlink control information for an uplink data channel to be transmitted in an uplink subframe $U_2$ of a second cell among the plurality of cells to the user equipment in a downlink subframe $D_1$ of a first cell among the plurality of cells; and receiving the uplink data channel from the user equipment in the uplink subframe $U_2$ according to the downlink control information, wherein the first cell and the second cell have different time division duplex (TDD) configurations, and wherein the downlink subframe $D_1$ is a subframe configured for transmission of downlink control information for an uplink subframe $U_1$ of the first cell (where $D_1$, $U_1$, and $U_2$ are non-negative integers), and the uplink subframe $U_1$ is an uplink subframe which is the nearest to the uplink subframe $U_2$ among an uplink subframe of the first cell, which coincides with the uplink subframe $U_2$, and uplink subframes of the first cell, which are prior to the uplink subframe $U_2$.

In another aspect of the present invention, provided herein is a user equipment, in which a plurality of cells is configured, for receiving downlink control information from a base station, including a Radio Frequency (RF) unit configured to transmit and receive a radio signal; and a processor configured to control the RF unit, wherein the processor controls the RF unit to receive downlink control information for an uplink data channel to be transmitted in an uplink subframe $U_2$ of a second cell among the plurality of cells from the base station in a downlink subframe $D_1$ of a first cell among the plurality of cells and controls the RF unit to transmit the uplink data channel to the base station in the uplink subframe $U_2$ according to the downlink control information, wherein the first cell and the second cell have different time division duplex (TDD) configurations, and wherein the downlink subframe $D_1$ is a subframe configured for transmission of downlink control information for an uplink subframe $U_1$ of the first cell (where $D_1$, $U_1$, and $U_2$ are non-negative integers), and the uplink subframe $U_1$ is an uplink subframe which is the nearest to the uplink subframe $U_2$ among an uplink subframe of the first cell, which coincides with the uplink subframe $U_2$, and uplink subframes of the first cell, which are prior to the uplink subframe $U_2$.

In another aspect of the present invention, provided herein is a base station for transmitting downlink control information to a user equipment in which a plurality of cells is configured, including a Radio Frequency (RF) unit configured to transmit and receive a radio signal; and a processor configured to control the RF unit, wherein the processor controls the RF unit to transmit downlink control information for an uplink data channel to be transmitted in an uplink subframe $U_2$ of a second cell among the plurality of cells to the user equipment in a downlink subframe $D_1$ of a first cell among the plurality of cells and controls the RF unit to receive the uplink data channel from the user equipment in the uplink subframe $U_2$ according to the downlink control information, wherein the first cell and the second cell have different time division duplex (TDD) configurations, and wherein the downlink subframe $D_1$ is a subframe configured for transmission of downlink control information for an uplink subframe $U_1$ of the first cell (where $D_1$, $U_1$, and $U_2$ are non-negative integers), and the uplink subframe $U_1$ is an uplink subframe which is the nearest to the uplink subframe $U_2$ among an uplink subframe of the first cell, which coincides with the uplink subframe $U_2$, and uplink subframes of the first cell, which are prior to the uplink subframe $U_2$.

In each aspect of the present invention, the uplink subframe $U_1$ of the first cell may be an uplink subframe of the first cell which is the nearest to the uplink subframe $U_2$ among the uplink subframes prior to the uplink subframe $U_2$ of the second cell when a subframe of the first cell corresponding to the uplink subframe $U_2$ of the second cell acts as downlink, and the uplink subframe $U_1$ of the first cell may be a subframe sharing a same time resource as the uplink subframe $U_2$ when the subframe of the first cell corresponding to the uplink subframe $U_2$ of the second cell acts as uplink.

In each aspect of the present invention, the downlink control information for the uplink data channel to be transmitted/received in the uplink subframe $U_2$ may include information indicating the uplink subframe $U_2$.

In each aspect of the present invention, downlink control information for N uplink subframes of the second cell may be transmitted from the base station to the user equipment in downlink subframes of the first cell, configured for transmission of downlink control information for M uplink subframes of the first cell which are the nearest to the uplink subframe $U_2$ among the uplink subframe of the first cell, which coincides with the uplink subframe $U_2$, and the uplink subframes of the first cell, which are prior to the uplink subframe $U_2$, where M and N are positive integers, and N is the number of consecutive uplink subframes of the second cell, and M≤N.

The above technical solutions are merely some parts of the embodiments of the present invention and various embodiments into which the technical features of the present invention are incorporated can be derived and understood by persons skilled in the art from the following detailed description of the present invention.

Advantageous Effects

According to the present invention, more effective transmission/reception of scheduling information for UL data can be performed in a situation in which a plurality of carriers is aggregated and a cross-carrier scheduling is configured between the aggregated carriers.

In addition, according to the present invention, more effective transmission/reception of ACKnowledgement (ACK)/Negative ACK (NACK) for UL data can be performed in a situation in which a plurality of carriers is aggregated and cross-carrier scheduling is configured between the aggregated carriers.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention. In the drawings.

MODE FOR INVENTION

Figure 1:
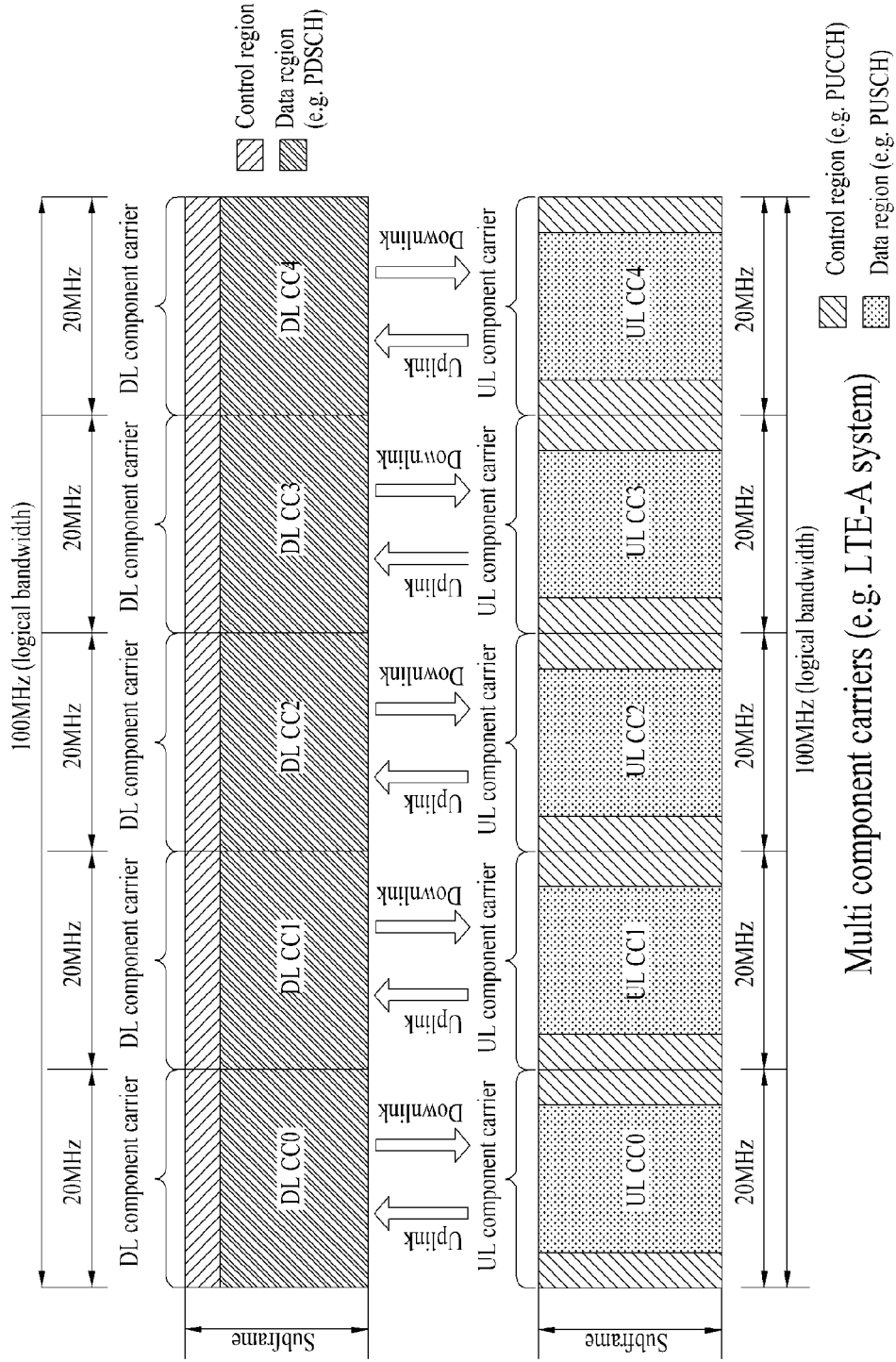
FIG. 1 illustrates an example of performing communication in a multicarrier situation.

Hereinafter, the exemplary embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment through which the present invention can be carried out. The following detailed description includes detailed matters to provide full understanding of the present invention. However, it will be apparent to those skilled in the art that the present invention can be carried out without the detailed matters.

In some cases, to prevent the concept of the present invention from becoming ambiguous, structures and apparatuses of the known art will be omitted, or will be shown in the form of a block diagram based on main functions of each structure and apparatus. In addition, wherever possible, the same reference numbers will be used throughout the drawings and the specification to refer to the same or like parts.

In the present invention, a User Equipment (UE) may be a fixed or mobile device. Examples of the UE include various devices that transmit and receive user data and/or various kinds of control information to and from a base station. The UE may be referred to as a Terminal Equipment (TE), a Mobile Station (MS), a Mobile Terminal (MT), a User Terminal (UT), a Subscriber Station (SS), a wireless device, a Personal Digital Assistant (PDA), a wireless modem, or a handheld device. In addition, in the present invention, a Base Station (BS) means a fixed station that performs communication with a UE and/or another BS, and exchanges various kinds of data and control information with the UE and another BS. The BS may be referred to as an Advanced Base Station (ABS), a Node-B (NB), an Evolved-NodeB (eNB), a Base Transceiver System (BTS), an Access Point (AP), or a Processing Server (PS).

In the present invention, a Physical Downlink Control Channel (PDCCH), a Physical Control Format Indicator Channel (PCFICH), a Physical Hybrid automatic retransmit request Indicator Channel (PHICH), and a Physical Downlink Shared CHannel (PDSCH) may indicate a set of time-frequency resources or Resource Elements (REs) carrying Downlink Control Information (DCI), a set of time-frequency resources or REs carrying Control Format Indicator (CFI), a set of time-frequency resources or REs carrying downlink ACK/NACK, and a set of time-frequency resources or REs carrying DL data, respectively. In addition, a Physical Uplink Control CHannel (PUCCH), a Physical Uplink Shared CHannel (PUSCH), and a Physical Random Access CHannel (PRACH) may indicate a set of time-frequency resources or REs carrying Uplink Control Information (UCI), a set of time-frequency resources or REs carrying UL data, and a set of time-frequency resources REs carrying a random access signal, respectively. In the present invention, a time-frequency resource or RE that is assigned to or belongs to PDCCH/PCFICH/PHICH/PDSCH/PUCCH/PUSCH/PRACH may be called PDCCH/PCFICH/PHICH/PDSCH/PUCCH/PUSCH/PRACH RE or PDCCH/PCFICH/PHICH/PDSCH/PUCCH/PUSCH/PRACH resource. Therefore, in the present invention, PUCCH/PUSCH/PRACH transmission of a UE may be conceptually identical to UL control information/UL data/random access signal transmission on PUSCH/PUCCH/PRACH, respectively. In addition, PDCCH/PCFICH/PHICH/PDSCH transmission of a BS may be conceptually identical to DL data/control information transmission on PDCCH/PCFICH/PHICH/PDSCH, respectively.

Figure 2:
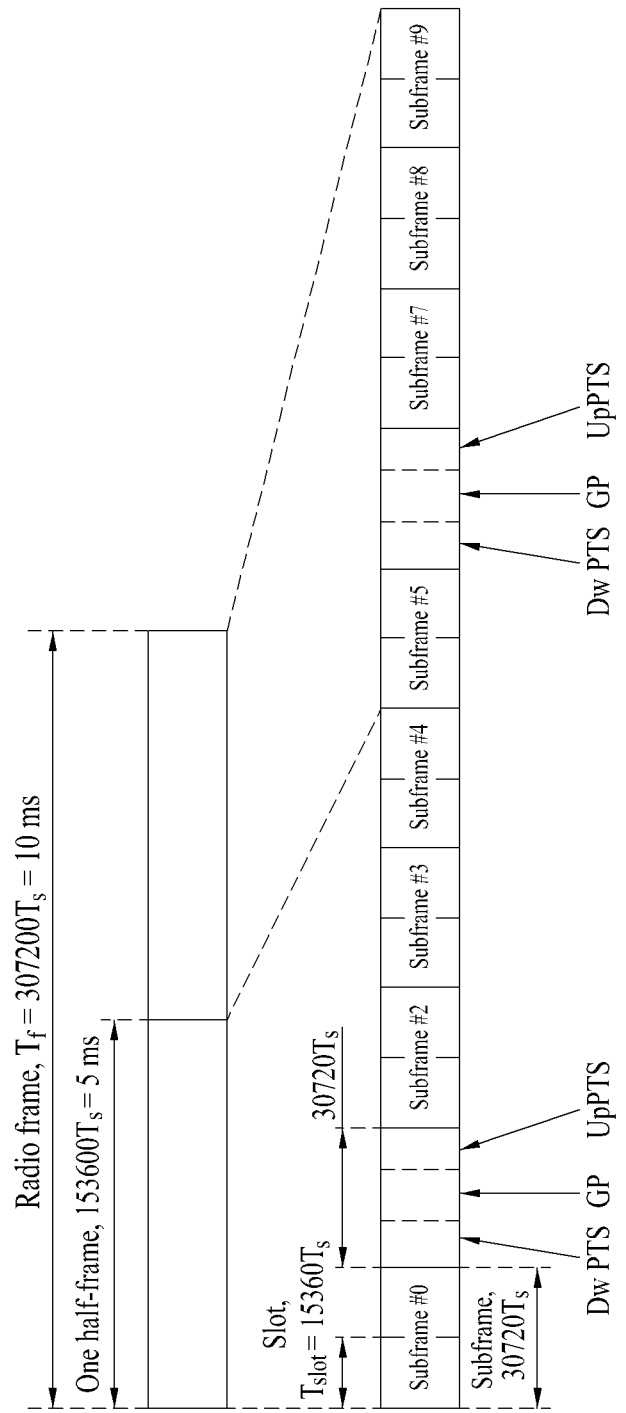
FIG. 2 illustrates an exemplary structure of a radio frame used in a wireless communication system.

FIG. 2 illustrates an exemplary structure of a radio frame used in a wireless communication system.

Referring to FIG. 2, a 3GPP LTE(-A) radio frame is 10 ms (307,200$T_s$) in duration. The radio frame is divided into 10 subframes of equal size. Subframe numbers may be assigned to the 10 subframes within the radio frame, respectively. $T_s$ denotes sampling time, where $T_s=1/(2048\times15$ kHz$)$. Each subframe is 1 ms long and further divided into two slots. 20 slots are sequentially numbered from 0 to 19 in a radio frame. Duration of each slot is 0.5 ms. A time interval in which one subframe is transmitted is defined as a Transmission Time Interval (TTI). Time resources may be distinguished by a radio frame number (or radio frame index), a subframe number (or subframe index), a slot number (or slot index), and the like.

A radio frame may have different configurations according to duplex mode. In FDD mode for example, since DL transmission and UL transmission are discriminated according to frequency, a radio frame for a specific frequency band includes either DL subframes or UL subframes. In TDD mode, since DL transmission and UL transmission are discriminated according to time, a radio frame for a specific frequency band includes both DL subframes and UL subframes.

Particularly, FIG. 2 illustrates a TDD frame structure used in 3GPP LTE(-A). Table 1 shows exemplary DL-UL configurations for subframes in a radio frame in TDD mode.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms  | D | S | U | U | U | D | S | U | U | U |
| 1 | 5 ms  | D | S | U | U | D | D | S | U | U | D |
| 2 | 5 ms  | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms  | D | S | U | U | U | D | S | U | U | D |

In Table 1, D is a DL subframe, U is a UL subframe, and S is a special subframe. The special subframe includes three fields, i.e., Downlink Pilot Time Slot (DwPTS), Guard Period (GP), and Uplink Pilot Time Slot (UpPTS). DwPTS is a time period reserved for DL transmission and UpPTS is a time period reserved for UL transmission. Table 2 shows an exemplary special frame configuration.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

Figure 3:
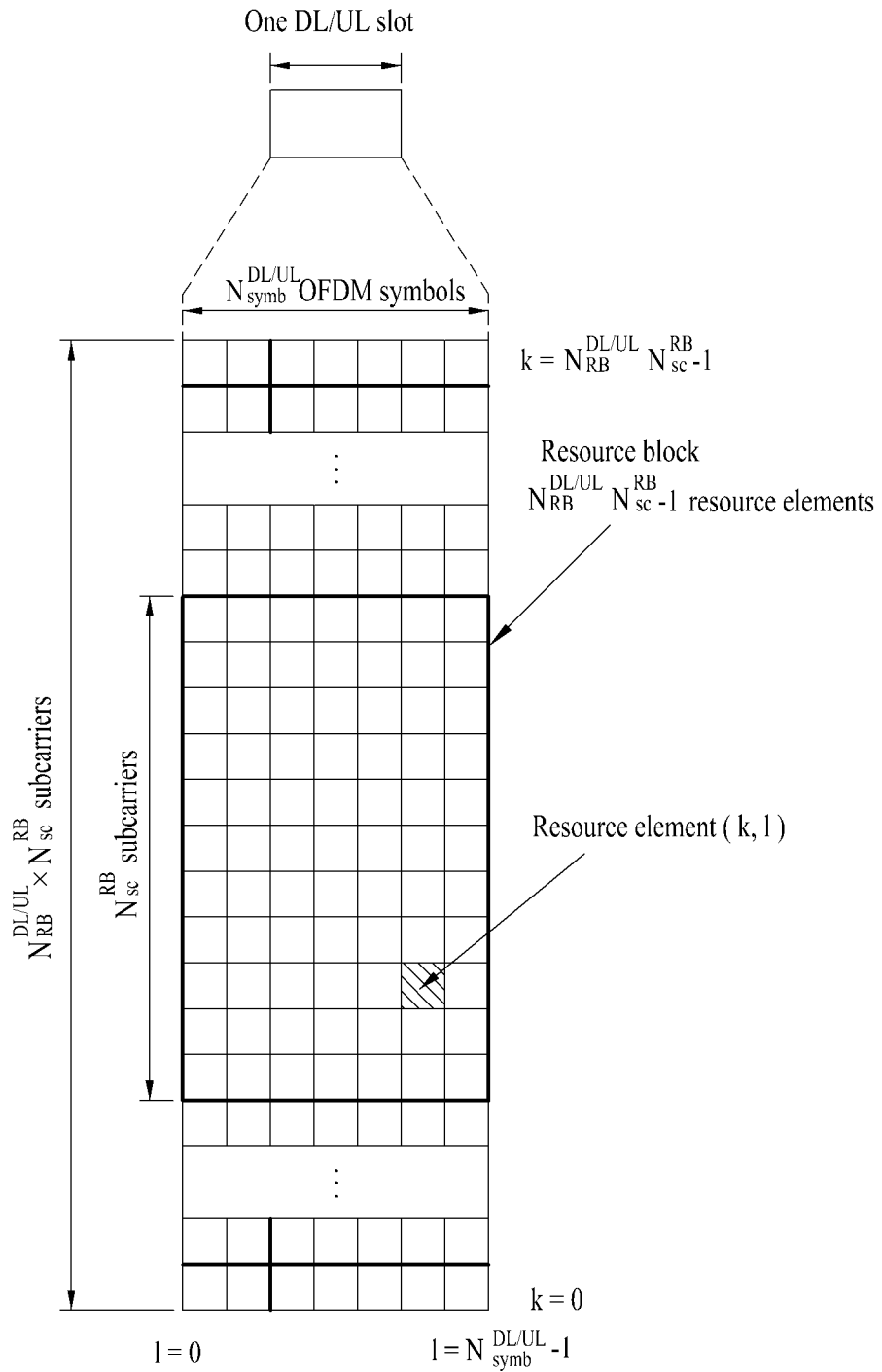
FIG. 3 illustrates an exemplary structure of a DL/UL slot in a wireless communication system.

FIG. 3 illustrates an exemplary structure of a DL/UL slot in a wireless communication system. Specifically, FIG. 3 illustrates the structure of a resource grid in a 3GPP LTE(-A) system.

Referring to FIG. 3, a slot includes a plurality of OFDM symbols in the time domain and a plurality of Resource Blocks (RBs) in the frequency domain. An OFDM symbol may refer to one symbol duration. An RB includes a plurality of subcarriers in the frequency domain. An OFDM symbol may also be called an SC-FDM symbol etc. according to a multiple access scheme. The number of OFDM symbols per slot may vary depending on channel bandwidth and CP length. For instance, one slot includes 7 OFDM symbols in case of a normal CP, whereas one slot includes 6 OFDM symbols in case of an extended CP. While a subframe is shown in FIG. 2 as having a slot with 7 OFDM symbols for convenience of description, embodiments of the present invention are also applicable to subframes with any other number of OFDM symbols. A resource including one OFDM symbol and one subcarrier is referred to as a Resource Element (RE) or a tone.

Referring to FIG. 3, a signal transmitted in each slot may be expressed by a resource grid including $N^{DL/UL}_{RB} \cdot N^{RB}_{sc}$ subcarriers and $N^{DL/UL}_{symb}$ OFDM or SC-FDM symbols. $N^{DL}_{RB}$ represents the number of RBs in a DL slot and $N^{UL}_{RB}$ represents the number of RBs in a UL slot. $N^{DL}_{RB}$ and $N^{UL}_{RB}$ depend on a DL transmission bandwidth and a UL transmission bandwidth, respectively. Each OFDM symbol includes $N^{DL/UL}_{RB} \cdot N^{RB}_{sc}$ subcarriers. The number of subcarriers per carrier is determined by the size of Fast Fourier Transform (FFT). Subcarriers may be divided into data subcarriers for data transmission, reference signal subcarriers for reference signal transmission, and null subcarriers for a guard band and a Direct Current (DC) component. The null carriers for the DC component are unused remaining subcarriers and are mapped to a carrier frequency $f_0$ in a process of generating an OFDM signal. The carrier frequency is also referred to as a center frequency. $N^{DL}_{symb}$ represents the number of OFDM or SC-FDMA symbols in the DL slot and $N^{UL}_{symb}$ represents the number of OFDM or SC-FDMA symbols in the UL slot. $N^{RB}_{sc}$ represents the number of subcarriers in one RB. An RB is defined as $N^{DL/UL}_{symb}$ (e.g. 7) consecutive OFDM symbols or SC-FDMA symbols in the time domain and $N^{RB}_{sc}$ (e.g. 12) consecutive subcarriers in the frequency domain. Therefore, one PRB includes $N^{DL/UL}_{symb} \cdot N^{RB}_{sc}$ REs. Each RE in the resource grid may be uniquely identified by an index pair (k,l) in a slot. k is a frequency-domain index ranging from 0 to $N^{DL/UL}_{RB} \cdot N^{RB}_{sc} - 1$ and l is a time-domain index ranging from 0 to $N^{DL/UL}_{symb} - 1$.

Figure 4:
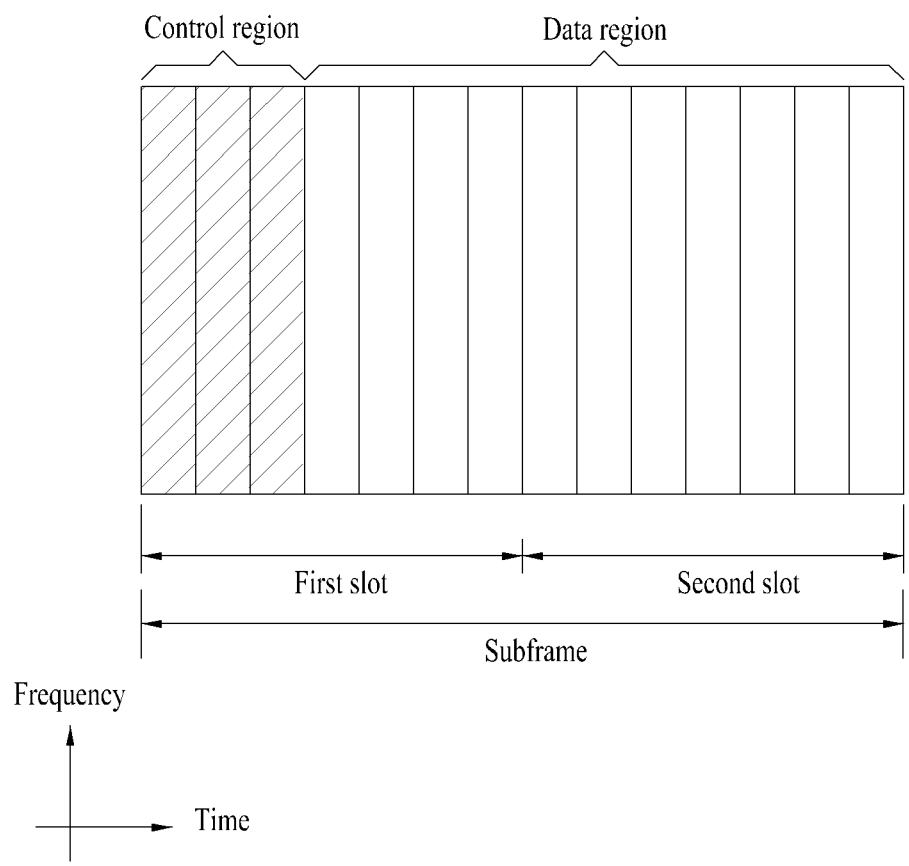
FIG. 4 illustrates an exemplary structure of a DL subframe used in a 3GPP LTE(-A) system.

FIG. 4 illustrates an exemplary structure of a DL subframe used in a 3GPP LTE(-A) system.

Referring to FIG. 4, a DL subframe may be divided into a control region and a data region. The control region includes one or more OFDM symbols, starting from the first OFDM symbol. In the DL subframe of the 3GPP LTE(-A) system, the control region is configured as a region in which a PDCCH can be transmitted. Accordingly, the control region in the DL subframe is also referred to as a PDCCH region. The number of OFDM symbols used for the control region in the DL a subframe may be independently configured on a subframe basis and signaled through a PCFICH. A BS may transmit control information to a UE or UEs in the control region. To transmit control information, a PDCCH, a PCFICH, a PHICH, etc. may be allocated to the control region.

The BS may transmit information related to resource assignment of a Paging CHannel (PCH) and a DL Shared CHannel (DL-SCH) that are transport channels, a UL scheduling grant (hereinafter, UL grant), a DL scheduling grant (hereinafter, DL grant), HARQ information, a Downlink Assignment Index (DAI), a Transmit Power Control (TPC) command, etc. to each UE or UE group on a PDCCH. Information related to resource assignment carried by a PDCCH may include RB assignment information, i.e. frequency resource information, used for UL/DL transmission. The BS may allocate frequency resources for a UE through the PDCCH.

The BS may transmit data to a UE or UE group in the data region. Data transmitted in the data region is referred to as user data. A PDSCH may be allocated to the data region for user data transmission. The PCH and the DL-SCH are transmitted on the PDSCH. A UE may decode control information received on a PDCCH and thus read data received on the PDSCH. The size and usage of control information transmitted on a PDCCH may vary according to Downlink Control Information (DCI) formats and the size of the control information may vary according to coding rates. Information indicating to which UE or UE group PDSCH data is transmitted and information indicating how the UE or UE group should receive and decode the PDSCH data are transmitted on the PDCCH. For example, it is assumed that a specific PDCCH is CRC-masked with a Radio Network Temporary Identity (RNTI) 'A' and information about data transmitted using a radio resource 'B' (e.g. frequency location) and using transport format information 'C' (e.g. transmission block size, modulation scheme, coding information, etc.) is transmitted through a specific DL subframe. Then, the UE monitors the PDCCH using RNTI information thereof. The UE having the RNTI 'A' receives the PDCCH and receives the PDSCH indicated by 'B' and 'C' through information of the received PDCCH.

A plurality of PDCCHs may be transmitted in the control region. A UE may monitor the plurality of PDCCHs to detect a PDCCH thereof. Basically, the UE does not know the location at which a PDCCH thereof is transmitted. Therefore, the UE performs blind detection (referred also to as blind decoding) for all PDCCHs of a corresponding DCI format in every subframe until a PDCCH having an identity thereof is received.

Meanwhile, as described with reference to FIG. 1, CA or bandwidth aggregation technology has recently been discussed. For example, referring to FIG. 1, five CCs, each of 20 MHz, may be aggregated on each of UL and DL to support a bandwidth of 100 MHz. The respective CCs may be contiguous or non-contiguous in the frequency domain. For convenience, FIG. 1 shows the case in which the bandwidth of a UL CC is the same as the bandwidth of a DL CC and the two are symmetrical. However, the bandwidth of each CC may be independently determined. It is also possible to configure asymmetric CA in which the number of UL CCs is different from the number of DL CCs. A UL CC and a DL CC may also be referred to as UL resources and DL resources, respectively. Even when a BS manages X DL CCs, a frequency bandwidth which can be received by a specific UE may be limited to Y ($\leq$X) DL CCs. In this case, the UE needs to monitor DL signals/data transmitted through the Y CCs. In addition, even when the BS manages L UL CCs, a frequency bandwidth which can be received by a specific UE may be limited to M ($\leq$L) UL CCs. The limited DL/UL CCs for a specific UE are referred to as serving UL/DL CCs configured in the specific UE. The BS may allocate a prescribed number of CCs to the UE by activating some or all of the CCs managed by the BS or by deactivating some CCs managed by the BS. The BS may change the activated/deactivated CCs and change the number of activated/deactivated CCs. Various parameters for CA may be configured cell-specifically, UE group-specifically, or UE-specifically. Once the BS allocates available CCs to the UE cell-specifically or UE-specifically, at least one of the allocated CCs is not deactivated, unless overall CC allocation to the UE is reconfigured or the UE is handed over. Hereinafter, the CC that is not deactivated unless overall CC allocation to the UE is reconfigured is referred to as a Primary CC (PCC) and a CC that the BS can freely activate/deactivate is referred to as a Secondary CC (SCC). Single carrier communication uses one PCC for communication between the UE and the BS and does not use the SCC for communication. Meanwhile, the PCC and SCC may also be distinguished based on control information. For example, specific control information may be configured to be transmitted/received only through a specific CC. Such a specific CC may be referred to as a PCC and the other CC (or CCs) may be referred to as an SCC (or SCCs). For instance, control information transmitted on a PUCCH may correspond to such specific control information. Thus, if control information transmitted on the PUCCH can be transmitted to the BS from the UE only through the PCC, a UL CC in which the PUCCH of the UE is present may be referred to as a UL PCC and the other UL CC (or CCs) may be referred to as a UL SCC (SCCs). As another example, if a UE-specific CC is used, the specific UE may receive a DL Synchronization Signal (SS) from the BS as specific control information. In this case, a DL CC with which the specific UE establishes synchronization of initial DL time by receiving the DL SS (i.e. a DL CC used for attempting to access a network of the BS) may be referred to as a DL PCC and the other DL CC (or CCs) may be referred to as a DL SCC (or SCCs). In a 3GPP LTE(-A) communication system, multicarrier communication uses one PCC and no SCC or one or more SCCs per UE. However, this is the definition according to LTE(-A) and communication using multiple PCCs per UE will be permitted in the future. The PCC may be referred to as a primary CC, an anchor CC, or a primary carrier and the SCC may be referred to as a secondary CC or a secondary carrier.

Meanwhile, 3GPP LTE(-A) uses the concept of cells to manage radio resources. A cell is defined as a combination of DL resources and UL resources, that is, a combination of a DL CC and a UL CC. The cell can be configured of DL resources alone, or of both DL resources and UL resources. When CA is supported, a linkage between a carrier frequency of the DL resources (or DL CC) and a carrier frequency of the UL resources (or UL CC) may be indicated by system information. For example, a combination of the DL resources and the UL resources may be indicated by a System Information Block type 2 (SIB2) linkage. In FDD using different UL and DL operating bandwidths, different carrier frequencies are linked to constitute one serving CC (or one serving cell) and the SIB2 linkage indicates a frequency of a UL CC using a frequency different from a frequency of a DL CC accessed by the UE. In TDD using the same UL and DL operating bandwidth, one carrier frequency constitutes one serving CC and the SIB linkage indicates a frequency of a UL CC using the same frequency as a frequency of a DL CC accessed by the UE.

Here, the carrier frequency refers to a center frequency of each cell or CC. A cell that operates on a primary frequency (or PCC) may be referred to as a Primary Cell (PCell) and a cell that operates on a secondary frequency (or SCC) may be referred to as a Secondary Cell (SCell). The primary frequency (or PCC) refers to a frequency (or CC) used for the UE to perform an initial connection establishment or connection re-establishment procedure. PCell may refer to a cell indicated during a handover process. The secondary frequency (or SCC) refers to a frequency (or CC) that is configurable after RRC connection setup is performed and is usable to provide additional radio resources. The PCell and SCell may be collectively referred to as a serving cell. Accordingly, for a UE in an RRC_CONNECTED state, for which CA is not configured or CA is not supported, only one serving cell comprised of only a PCell is present. Meanwhile, for a UE in an RRC_CONNECTED state, for which CA is configured, one or more serving cells may be present and the one or more serving cells may include one PCell and one or more SCells. However, in the future, it may be permitted that serving cells are configured to include a plurality of PCells. For CA, a network may configure one or more SCells for a UE that supports CA in addition to the PCell initially configured in the connection establishment procedure after an initial security activation procedure is initiated. However, even if the UE supports CA, the network may configure only the PCell for the UE, without adding the SCells.

Figure 5:
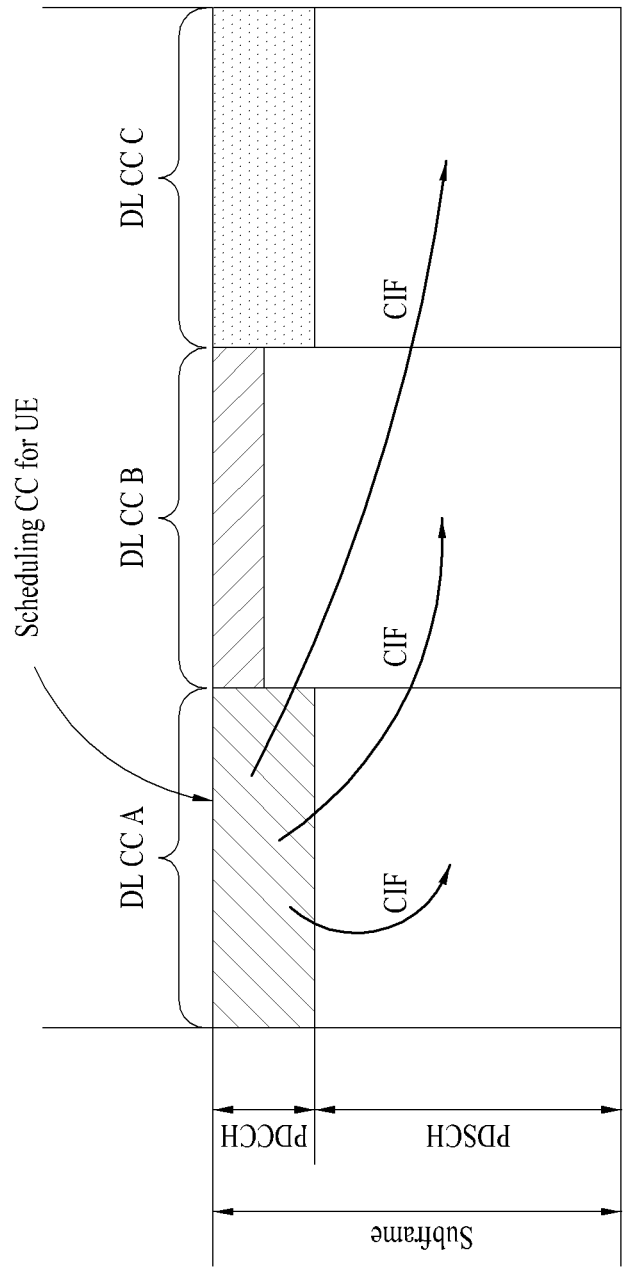
FIG. 5 illustrates exemplary DL scheduling when a plurality of carriers is aggregated.

FIG. 5 illustrates exemplary DL scheduling when a plurality of carriers is aggregated.

In case of communication using a single carrier, only one serving cell is present and, therefore, a PDCCH carrying a UL/DL grant and a PUSCH/PDSCH corresponding to the PDCCH are transmitted in the same cell. In other words, in case of FDD in a single carrier, a PDCCH for a DL grant for a PDSCH that is to be transmitted on a specific DL CC is transmitted on the specific DL CC and a PDCCH for a UL grant for a PUSCH that is to be transmitted on a specific UL CC is transmitted on a DL CC linked to the specific UL CC.

On the contrary, in a multicarrier system, a plurality of cells may be configured and, therefore, transmission of a UL/DL grant in a serving cell having a good channel state may be permitted. Thus, if a cell carrying the UL/DL grant, which scheduling information, is different from a cell performing UL/DL transmission corresponding to the UL/DL grant, this is referred to as cross-carrier scheduling. The 3GPP LTE(-A) system may support multicarrier aggregation and cross-carrier scheduling based on multicarrier aggregation, for data transmission rate improvement and stable control signaling.

Referring to FIG. 5, when cross-carrier scheduling (or cross-CC scheduling) is applied, a PDCCH for DL allocation for a DL CC B/C, i.e. a PDCCH carrying a DL grant, may be transmitted on a DL CC A and a PDSCH corresponding to the PDCCH may be transmitted on a DL CC B/C. A Carrier Indicator Field (CIF) may be introduced for cross-CC scheduling. Whether the CIF is present in the PDCCH may be indicated semi-statically and UE-specifically (or UE group-specifically) through higher layer signaling (e.g. RRC signaling). The baseline of PDCCH transmission is summarized as follows.

CIF disabled: PDCCH on a DL CC assigns PDSCH resources on the same DL CC or PUSCH resources on a single linked UL CC.

No CIF

Same as LTE PDCCH structure (same coding and same Control Channel Element (CCE)-based resource mapping) and DCI format CIF enabled: PDCCH on a DL CC can assign PDSCH/PUSCH resources on a specific DL/UL CC among multiple aggregated DL/UL CCs using CIF.

Extended LTE DCI format with CIF

CIF (if configured) is a fixed x-bit field (e.g. x=3).

CIF (if configured) location is fixed regardless of DCI format size.

Reuse of LTE PDCCH structure (same coding and same CCE-based resource mapping)

One or more scheduling CCs may be configured for one UE and one of the scheduling CCs may be a PCC which is in charge of specific DL control signaling and UL PUCCH transmission. The scheduling CCs may be configured UE-specifically, UE-group-specifically, or cell-specifically. The scheduling CC may be configured so as to directly schedule at least itself. That is, the scheduling CC may become a scheduled CC thereof. Only one scheduling CC per scheduled CC may be configured. In other words, a plurality of scheduling CCs cannot be configured for one scheduled CC. In the present invention, a CC carrying a PDCCH is referred to as a scheduling CC or a Monitoring CC (MCC) and a CC carrying a PDSCH/PUSCH scheduled by the PDCCH is referred to as a scheduled CC.

The scheduling CC includes a DL CC among all aggregated DL CCs. The UE detects/decodes the PDCCH only on a corresponding DL CC. That is, during cross-CC scheduling, both DL and UL grant PDCCHs for scheduling PDSCH and PUSCH of the scheduling CC or scheduled CC may be transmitted/received only through the scheduling CC. A DL ACK/NACK channel (or a PHICH in case of 3GPP LTE(-A)) carrying ACK/NACK for the PUSCH transmitted through the scheduling CC or scheduled CC may be transmitted/received only through the scheduling CC. ACK/NACK for the PDSCH transmitted through the scheduling CC or scheduled CC may be transmitted/received on a UL control channel (a PUCCH in case of 3GPP LTE(-A)) or a UL data channel (a PUSCH in case of 3GPP LTE(-A)). The PUCCH may be transmitted on a PCC. In this case, the PDSCH/PUSCH of the scheduling CC or scheduled CC refers to a PDSCH/PUSCH configured/allocated to be transmitted on a corresponding CC. The ACK/NACK of the scheduling CC or scheduled CC refers to ACK/NACK for data transmitted on a corresponding CC.

In TDD, most communication standards up to now consider only multicarrier aggregation having the same DL-UL configuration. If a plurality of aggregated CCs operates in the same DL-UL configuration, since DL/UL subframe (hereinafter SF) timings for all CCs are the same, a UL grant for scheduling a PUSCH of a scheduling/scheduled CC to be transmitted in a specific UL SF may be transmitted/received through a DL SF of the scheduling CC configured for transmission/reception of the UL grant scheduling the PUSCH to be transmitted in the specific UL SF. In addition, for a PHICH transmission/reception timing for a PUSCH transmitted through the scheduling CC and the scheduled CC in a specific UL SF, a PHICH transmission/reception timing configured in the corresponding UL SF of the scheduling CC may be applied.

However, in consideration of the difference in UL/DL load on each CC and the difference in channel state on each CC, it is preferable to permit a different DL-UL configuration per CC. If a plurality of CCs operating in different DL-UL configurations is aggregated and cross-CC scheduling is supported based on the aggregated CCs, a UL SF timing of the scheduling CC may differ from a UL SF timing of the scheduled CC. In other words, the scheduling CC and the scheduled CC in the same time resource duration may operate not as DL and DL or UL and UL but as UL and DL or DL and UL. Then, a UL grant transmission/reception timing for PUSCH scheduling in each UL SF or an ACK/NACK transmission/reception timing for PUSCH transmission in each UL SF may be independently configured per CC. Accordingly, if CA is configured based on different TDD DL-UL configurations, a UL grant transmission/reception timing configuration method and a DL ACK/NACK transmission/reception timing configuration method, for cross-scheduling, are needed.

Hereinafter, embodiments of the present invention will be described under the assumption of only aggregation of two CCs having different DL-UL configurations, i.e. one scheduling CC and one scheduled CC. However, the embodiments of the present invention may be applied to aggregation of more than two CCs having different DL-UL configurations. In the following description, "D" indicates a DL SF or a special SF and "U" indicates a UL SF. "DD" represents an SF in which both a scheduling CC and a scheduled CC are configured with DL, "DU" represents an SF in which a scheduling CC is configured with DL and a scheduled CC is configured with UL, "UD" represents an SF in which a scheduling CC is configured with UL and a scheduled CC is configured with DL, and "UU" represents an SF in which both a scheduling CC and a scheduled CC are configured with UL.

<UL Grant Timing>

Hereinafter, UL grant transmission/reception timing for cross-scheduling of CCs having different DL-UL configurations according to embodiments of the present invention will be described. In the embodiments of the present invention, UL grant timing for a specific UL SF of a specific CC refers to a DL SF of a CC configured such that a UL grant for scheduling a PUSCH transmitted in the specific UL SF of the specific CC is transmitted/received therein.

1. UL grant for PUSCH to be transmitted in UU and UD.

Figure 6:
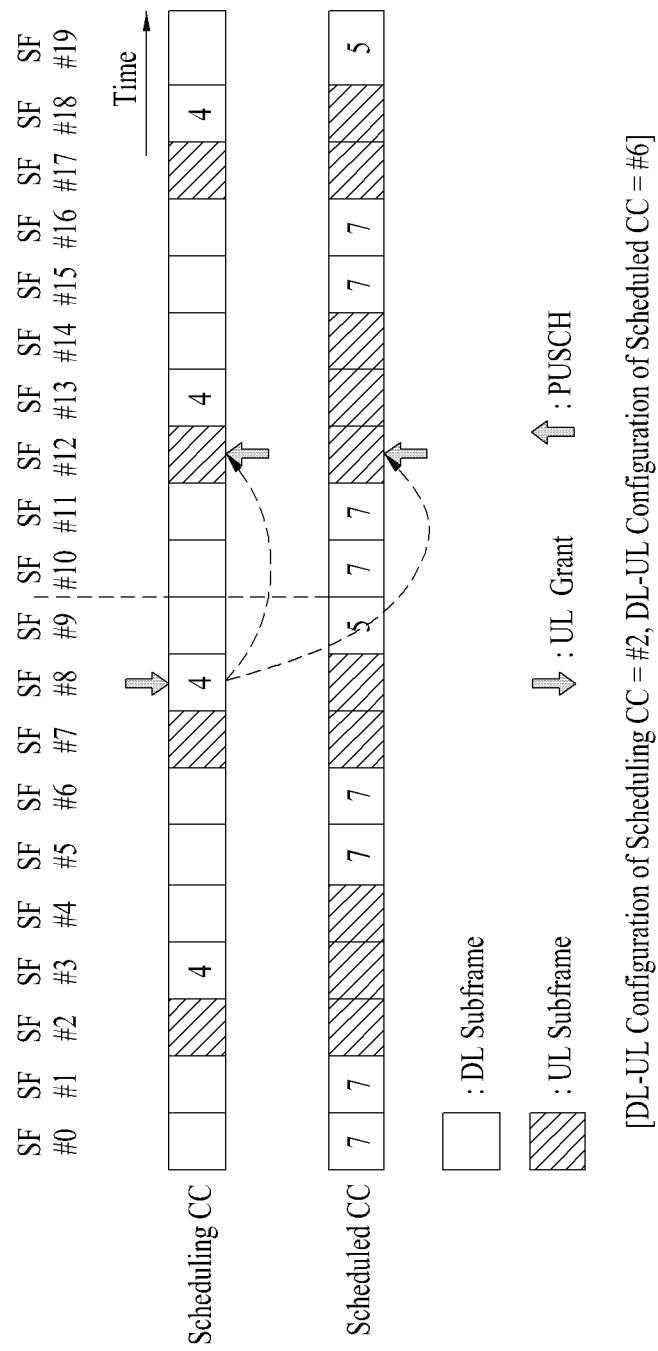
FIG. 6 illustrates an exemplary UL grant timing for PUSCH transmission in a UU SF.

FIG. 6 illustrates an exemplary UL grant timing for PUSCH transmission in a UU SF. Especially, FIG. 6 illustrates a radio frame in which DL-UL configuration #2 of Table 1 is applied to a scheduling CC and DL-UL configuration #6 of Table 1 is applied to a scheduled CC. In FIG. 6, a number indicated in each DL SF represents a time point $k_{PUSCHH}$ at which a PUSCH corresponding to a DL grant received in a corresponding DL SF is to be transmitted. Table 3 shows $k_{PUSCH}$ per TDD DL-UL configuration.

TABLE 3

| TDD UL-DL configuration | DL subframe number n | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | | | | 4 | 6 | | | |
| 1 | | 6 | | | 4 | | 6 | | | 4 |
| 2 | | | | 4 | | | | 4 | | |
| 3 | 4 | | | | | | | | 4 | 4 |
| 4 | | | 6 | 6 | | | | | 4 | 4 |
| 5 | | | 6 | | | | | | 4 | |
| 6 | 7 | 7 | | | | 7 | 7 | | | |

In Table 3, a number defined in a DL SF per DL-UL configuration corresponds to $k_{PUSCH}$. For example, referring to Table 3, $k_{PUSCH}$ of a DL SF 3 in DL-UL configuration #2 is 4. Upon detecting a PDCCH carrying a UL grant for the UE in an SF n, the UE may transmit a PUSCH in an SF n+$k_{PUSCH}$ according to $k_{PUSCH}$ given in Table 3. In FIG. 6, a number indicated in each DL SF corresponds to $k_{PUSCH}$ of Table 3.

For reference, in FIG. 6, subframes of which subframe numbers have the same value when a modulo-10 operation is applied thereto have the same location in each radio frame consisting of 10 subframes.

In a subframe configured with UU (hereinafter, UU SF) or a subframe configured with UD (hereinafter, UD SF), a scheduling CC basically includes a UL SF (i.e. operates as UL) and, therefore, a UL grant timing for a PUSCH to be transmitted in a UL SF of the scheduling CC exists in the scheduling CC. Accordingly, with respect to a UL grant timing for scheduling a PUSCH of the scheduling CC and a PUSCH of a scheduled CC, transmitted in a specific UU SF or UD SF, a UL grant timing configured for the UL SF of the scheduling CC in the specific SF may be applied. That is, if the UL SF is configured on the scheduling CC in the specific SF, a UL grant for a PUSCH of the scheduled CC may be transmitted in a DL SF in which the UL grant for the PUSCH of the scheduling CC is transmitted.

Referring to FIG. 6, SFs #2, #7, #12, and #17 correspond to UU SFs. For example, UL grants for the scheduling CC and scheduled CC of SF #12 may be transmitted through the scheduling CC in SF #8. In other words, a UE may receive a UL grant(s) for the scheduling CC and/or scheduled CC from the BS in SF #8 on the scheduling CC and may transmit a PUSCH(s) through the scheduling CC and/or the scheduled CC in SF #12 which is a $k_{PUSH}$-th (i.e. fourth) SF after SF #8.

2. UL grant for PUSCH to be transmitted in DU

In case of an SF configured with DU (hereinafter, DU SF), since the scheduling CC does not include a UL SF unlike the UU SF or UD SF, a UL grant timing configured for the scheduling CC of the DU SF does not exist. Therefore, a UL grant timing for scheduling a PUSCH of the scheduled CC transmitted through the DU SF (i.e. SF #n) may be configured according to the following method.

Method 1: UL grant transmission/reception in a DL SF of a scheduling CC which is a DL SF nearest to a corresponding SF (i.e. SF #n) among SF #(n−$m_{PUSCH}$) and SFs prior to SF # (n−$m_{PUSCH}$)

Here, $m_{PUSCH}$ represents a minimum SF interval (e.g. 4 SFs or 4 ms) between a UL grant timing and a PUSCH transmission timing. For example, if $m_{PUSCH}$ is 4, the fourth SF after a DL SF in which a UL grant is transmitted or an SF corresponding to 'DL SF, in which the UL grant is transmitted, +4 ms' may be an SF in which the PUSCH can be transmitted.

Method 1 has an advantage of minimizing latency from UL grant reception/transmission to PUSCH transmission/reception.

Figure 7:
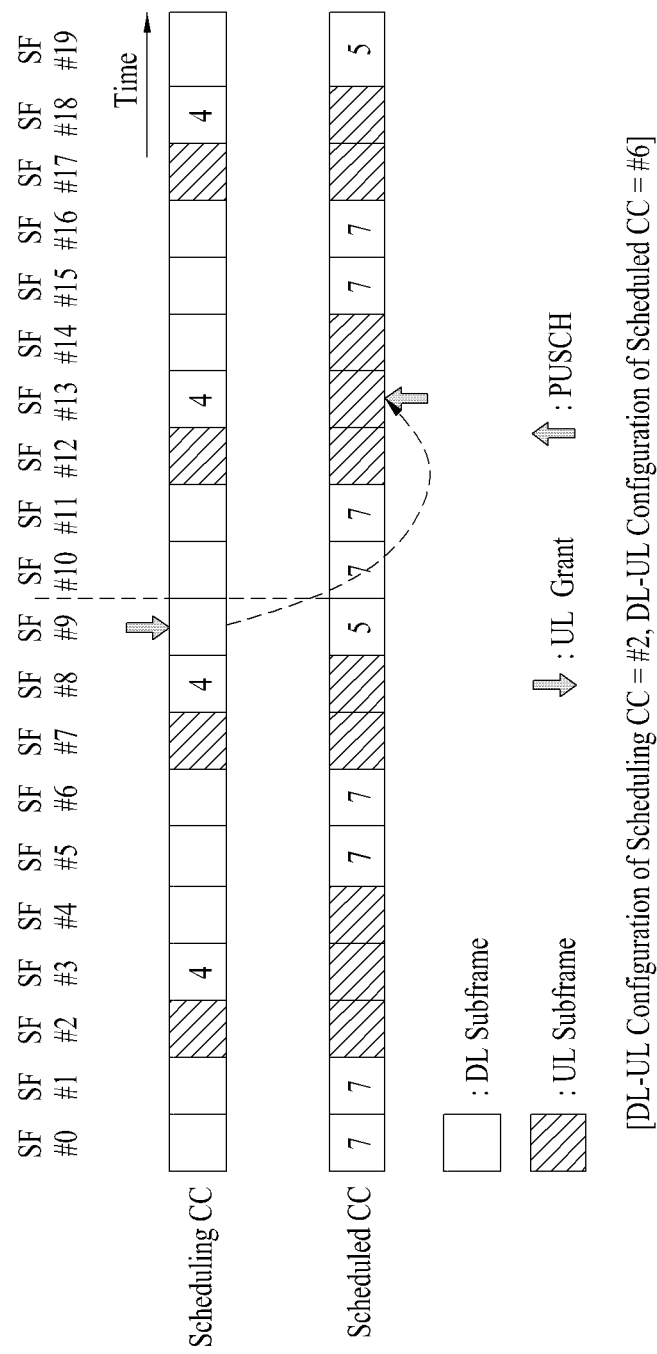
FIG. 7 illustrates an exemplary UL grant timing for PUSCH transmission in a DU SF according to Method 1 of the present invention.

FIG. 7 illustrates an exemplary UL grant timing for PUSCH transmission in a DU SF according to Method 1 of the present invention. Especially, FIG. 7 illustrates a UL grant timing for PUSCH transmission in a DU SF, when Method 1 is applied in the case where a scheduling CC and a scheduled CC operate in DL-UL configurations #2 and #6 of Table 1, respectively. It is assumed that $m_{PUSCH}$ is four SFs. In FIG. 7, a number indicated in each DL SF corresponds to $k_{PUSCH}$ of Table 3.

Referring to FIG. 7, when a UL grant timing according to Method 1 of the present invention is applied to a PUSCH of a scheduled CC transmitted in SF #13, a UL grant for the PUSCH of the scheduled CC to be transmitted in SF #13 may be transmitted/received in a DL SF (i.e. SF #9) of the scheduling CC, which is a DL SF nearest to SF #13 among SF #(13−4) and SFs before SF #(13−4) on the scheduled CC. The BS may schedule the PUSCH to be transmitted through the scheduled CC in SF #13 to the UE by transmitting the UL grant in SF #9. The UE may receive the UL grant in SF #9 and transmit the PUSCH corresponding to the UL grant in a UL SF of the scheduling CC, which is a UL SF nearest to SF #9 among SF #(9+4) and SFs after SF #(9+4).

Option 1: In application of Method 1, the DL SF of the scheduling CC, which is nearest to SF #n among SF #(n−$m_{PUSCH}$) and SFs prior to SF #(n−$m_{PUSCH}$) may be determined from among all DF SFs on the scheduling CC.

Option 2: Unlink Option 1, the DL SF of the scheduling CC, which is nearest to SF #n among SF #(n−$m_{PUSCH}$) and SFs before SF #(n−$m_{PUSCH}$) on the scheduling CC may be determined among only DL SFs in which UL grants are configured when the scheduling CC operates as a single CC. For example, DL SFs in which $k_{PUSCH}$ is configured according to Table 3 are DL SFs in which transmissions of UL grants in a single carrier system are configured. A UE configured to communicate on a single carrier attempts detection/decoding of a PDCCH not in all DL SFs but in only DL SFs in which $k_{PUSCH}$ is configured according to a corresponding DL-UL configuration. In consideration of backward compatibility with a single carrier system, a UL grant timing for a PUSCH of a scheduled CC to be transmitted in a DU SF may be restricted so that the UL grant timing may be determined among DL SFs in which $k_{PUSCH}$ is configured. In this case, referring to FIG. 7, a DL SF which is nearest to SF #13 among SF #(13−4) and SFs before SF #(13−4) on the scheduling CC is SF #8 and a UL grant for a PUSCH of the scheduled CC to be transmitted in SF #13 is transmitted/received on the scheduling CC of SF #8. On the contrary, for PDCCH load balancing, a DL SF for a UL grant may be determined among DL SFs which are not configured to transmit/receive the UL grant, i.e. DL SFs in which $k_{PUSCH}$ is not configured. In this case, referring to FIG. 7, SF #9 will be a UL grant timing for the PUSCH of the scheduled CC to be transmitted in SF #13.

Figure 8:
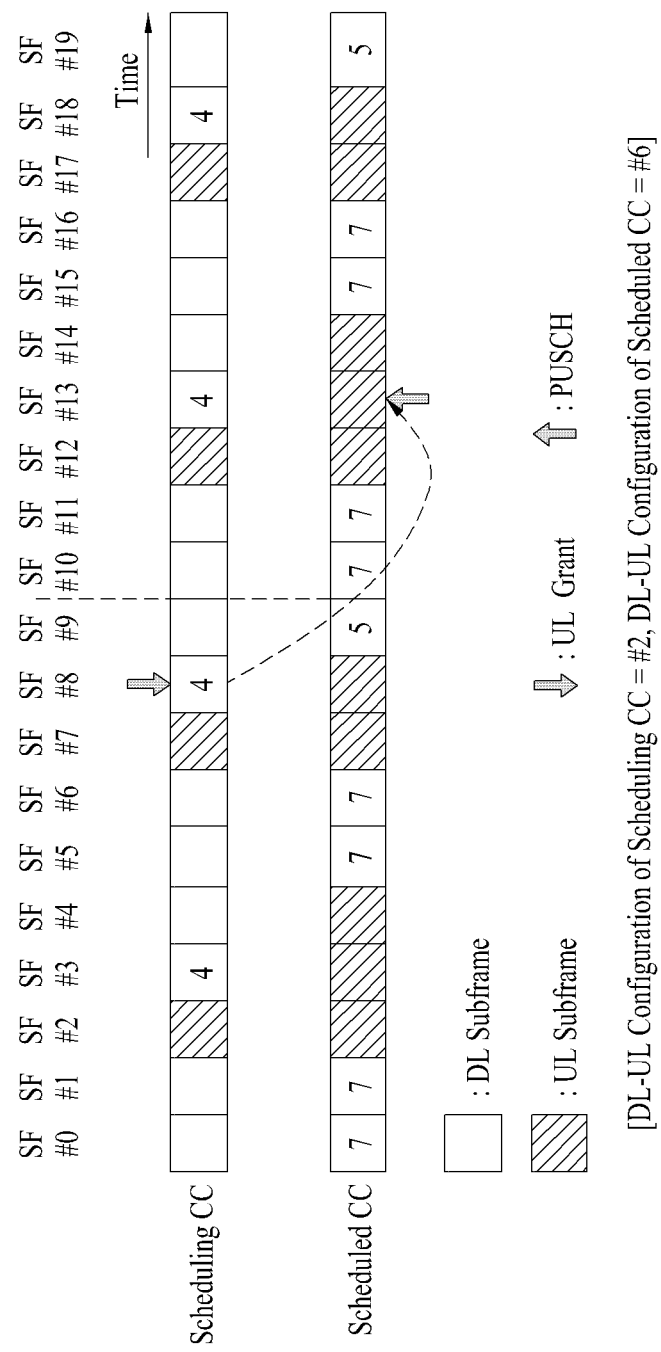
FIG. 8 illustrates an exemplary UL grant timing for PUSCH transmission in a DU SF according to Method 2 of the present invention.

Method 2: UL grant transmission/reception by applying a UL grant timing for a UL SF of a scheduling CC, which is nearest to SF #n among SFs before SF #n FIG. 8 illustrates an exemplary UL grant timing for PUSCH transmission in a DU SF according to Method 2 of the present invention. Particularly, FIG. 8 illustrates a UL grant timing for PUSCH transmission in a DU SF, when Method 2 is applied in the case where a scheduling CC and a scheduled CC operate in DL-UL configurations #2 and #6 of Table 1, respectively. In FIG. 8, a number indicated in each DL SF corresponds to kPUSCH of Table 3.

Referring to FIG. 8, when a UL grant timing according to Method 2 of the present invention is applied to a PUSCH of a scheduled CC transmitted in SF #13, a UL grant timing for a UL SF (i.e. SF #12) of the scheduling CC which is nearest to SF #13 among SFs prior to SF #13 may be used as a UL grant timing for the scheduled CC of SF #13. Since the UL grant timing for SF #12 of the scheduling CC is SF #8, the BS may transmit a UL grant for the scheduled CC of SF #12 to the UE through the scheduling CC in SF #8. The UE may detect/receive a corresponding PDCCH by monitoring the scheduling CC in SF #8. Upon receiving the UL grant through the scheduling CC in SF #8, the UE transmits the PUSCH of the scheduled CC to the BS in SF #12 corresponding to SF #(8+$k_{PUSCH}$) ($k_{PUSCH}$ configured in SF #8 is 4).

Method 2 of the present invention is advantageous in that a DL SF for UL grant transmission/reception for the scheduling CC is one of DL SFs configured such that transmission/reception of a UL grant is always allowed therein. That is, according to Method 2 of the present invention, the case does not occur in which DL SFs in which transmission/reception of the UL grant is not configured, for example, DL SFs without $k_{PUSCH}$ in Table 3, are determined as DL SFs for UL grant transmission/reception for the scheduled CC.

If Method 2 of the present invention is applied together with the UL grant timing configuration method for the scheduled CC to be transmitted in a UU SF, a UL grant timing for the scheduled CC in a specific SF may be determined based on a UL SF of the scheduling CC which is nearest to the specific SF among the specific SF and SFs prior to the specific SF. For example, referring to FIG. 8, the UL grant timing for the scheduled CC of SF #12, which is a UU SF, may be determined based on a UL SF which is nearest to SF #12 among SF #12 and SFs prior to SF #12 on the scheduling CC and the UL grant timing for the scheduled CC of SF #13 which is a DU SF may be determined based on a UL SF which is nearest to SF #13 among the SF #13 and UL SFs prior to SF #13 on the scheduling CC. In other words, UL grant timing for the scheduling CC and scheduled CC may be determined by applying the same rule to the UU SF, UD SF, and DU SF.

Figure 9:
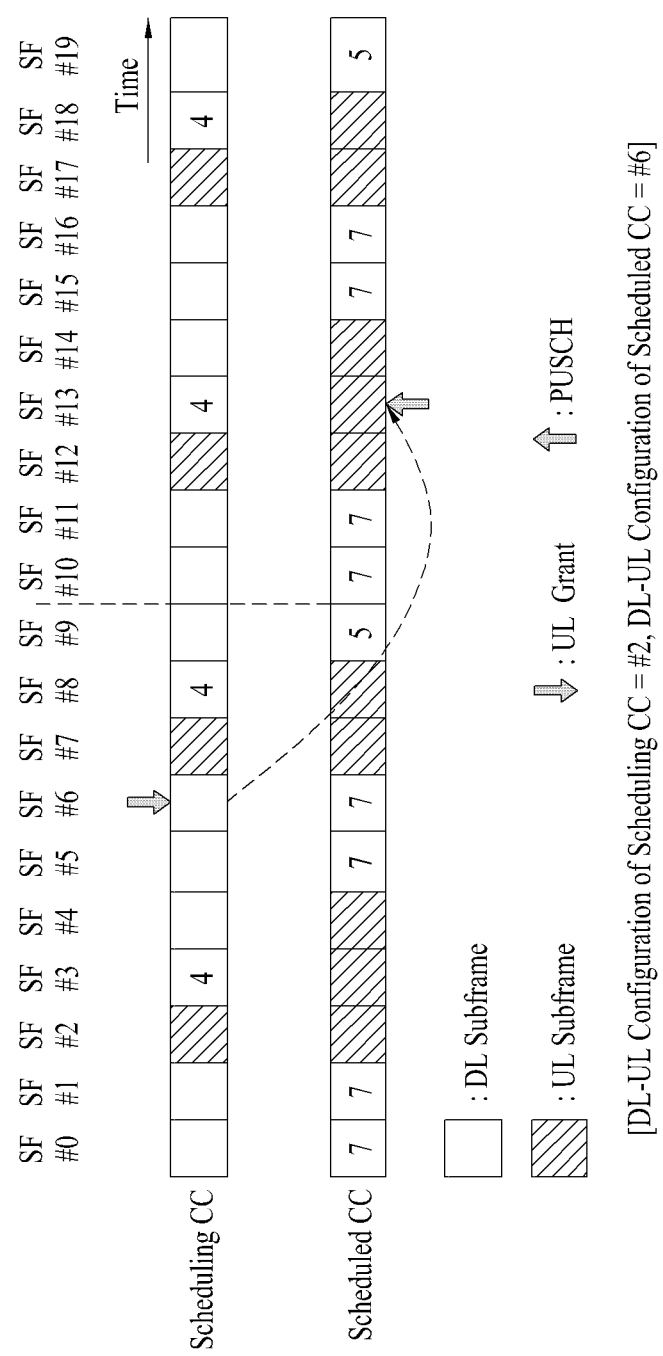
FIG. 9 illustrates an exemplary UL grant timing for PUSCH transmission in a DU SF according to Method 3 of the present invention.

Method 3: UL grant transmission/reception in a DL SF of a scheduling CC which is nearest to SF #n among a UL grant timing corresponding to a UL SF of scheduled CC in SF #n and SFs prior to the UL grant timing FIG. 9 illustrates an exemplary UL grant timing for PUSCH transmission in a DU SF according to Method 3 of the present invention. Especially, FIG. 9 illustrates a UL grant timing for PUSCH transmission in a DU SF when Method 3 is applied in the case in which a scheduling CC and a scheduled CC operate in DL-UL configurations #2 and #6 of Table 1, respectively. In FIG. 9, a number indicated in each DL SF corresponds to $k_{PUSCH}$ of Table 3.

Referring to FIG. 9, if a UL grant timing according to Method 2 of the present invention is applied to a PUSCH of a scheduled CC transmitted in SF #13, a UL grant timing for a UL SF of the scheduled CC of SF #13, i.e. a UL SF (SF #6) of a scheduling CC which is nearest to SF #13 among SF #6 and SFs prior to SF #6 may be used as the UL grant timing for the scheduled CC of SF #13. That is, the UL grant for the scheduling CC of SF #13 may be transmitted/received through the scheduling CC in SF #6.

Option 1 or Option 2 described in Method 1 of the present invention may also be applied to Method 3 of the present invention in the same manner.

Up to now, methods for configuring the UL grant timing for the scheduled CC based on an SF have been described. Hereinafter, methods for configuring the UL grant timing for the scheduled CC based on a cell, i.e. a CC, will be described.

1. UL Grant for PUSCH Transmission of a Scheduling CC

A UL grant timing for a UL SF in which a PUSCH is to be transmitted is applied to a UL grant for the PUSCH to be transmitted through a scheduling CC.

2. UL Grant for PUSCH Transmission of a Scheduled CC

A UL grant timing for a PUSCH of a scheduled CC to be transmitted in SF #n may be configured according to any one of the following methods. $m_{PUSCH}$ and $k_{PUSCH}$ used in the afore-mentioned Method 1, Method 2, and Method 3 have the same meaning as the following Method 1-1, Method 2-1, and Method 3-1. Method 1-1, Method 2-1, and Method 3-1 respectively correspond to Method 1, Method 2, and Method 3 for configuring the UL grant timing for the scheduled CC based on an SF but the above-described methods and the following methods have different application criteria. Accordingly, the UL grant timing for the scheduled CC configured according to Method 1/Method 2/Method 3 may be different from the UL grant timing for the scheduled CC configured according to Method 1-1/Method 2-1/Method 3-1.

Method 1-1: UL grant transmission/reception through a DL SF of a scheduling CC which is nearest to SF #n among SF #(n–$m_{PUSH}$) and SFs prior to SF #(n–$m_{PUSCH}$)

Option 1 or Option2 described in Method 1 of the present invention may also be identically applied to Method 1-1 of the present invention.

Method 2-1: UL grant transmission/reception for a UL SF of a scheduling CC which is nearest to SF #n among SF #n and SFs prior to SF #n Method 3-1: UL grant transmission/reception through a DL SF of a scheduling CC which is nearest to SF #n among a UL grant timing configured in a UL SF of the scheduled CC in SF #n and SFs prior to the UL grant timing Option 1 or Option 2 described in Method 1 of the present invention may also be identically applied to Method 3-1 of the present invention.

Meanwhile, if the afore-mentioned Method 1, Method 2, Method 3, Method 1-1, Method 2-1, and Method 3-1 are applied, the case in which the same UL grant timing for multiple UL SFs of the scheduled CC, i. e. a multi-grant timing, is configured may occur. That is, UL grants for scheduling PUSCHs of the scheduled CC to be transmitted in different UL SFs may be configured to be transmitted/received in the same DL SF of the scheduling CC. In this way, if a plurality of UL grants should be transmitted in one DL SF of one scheduling CC, the following methods may be considered.

(1) Alt 1: A UL grant timing configured according to any one of the aforementioned Method 1, Method 2, Method 3, Method 1-1, Method 2-1, and Method 3-1 is applied but, for a multi-grant timing, a field for discriminating/designating between SFs in a UL grant for PUSCH scheduling of the scheduled CC may be inserted. In this case, according to the number of UL grants capable of being transmitted/received at the multi-grant timing, the following schemes may be considered.

A. Alt 1-1: Single UL Grant

In Alt 1-1 of the present invention, PUSCH scheduling information of a scheduled CC for one or more SFs is transmitted/received using one UL grant, i.e. one PDCCH. According to Alt 1-1 of the present invention, only one UL grant may be transmitted/received for the scheduled CC in a DL SF of the scheduling CC, corresponding to a multi-grant timing. A field (of a bitmap type for example) for discriminating between SFs in which the scheduled CC is scheduled may be inserted in a corresponding UL grant. In this case, in order to prevent PHICH transmissions for multiple PUSCHs for the scheduled CC from colliding, the BS may allocate additional information (e.g. PHICH offset) for discriminating between different DeModulation Reference Signals (DMRSs) or PHICH resources per PUSCH of the scheduled CC. For example, in allocating PHICH resources, a DMRS may be explicitly allocated only to a specific PUSCH of the scheduled CC and may be implicitly allocated (i.e. according to predesignated offset) to the other PUSCHs of the scheduled CC.

B. Alt 1-2: Multiple UL Grants

In Alt 1-2 of the present invention, one UL grant, i.e. only PUSCH scheduling information of the scheduled CC for one SF, is transmitted on one PDCCH. According to Alt 1-2 of the present invention, a plurality of grants may be transmitted/received in a DL SF of the scheduling CC, which is corresponding to a multi-grant timing. A field (a form slimier to a CIF indicating a CC during cross-CC scheduling for example) indicating an SF in which a PUSCH of the scheduled CC is to be transmitted may be inserted to a corresponding UL grant.

Alt 2: Modifications of Method 1, Method 2, and Method 3 or Method 1-1, Method 2-1, and Method 3-1 may be applied in units of an SF Group (SFG) comprised of consecutive UL SFs of the scheduled CC (hereinafter, a scheduled CC-U SFG). It is assumed that the number of SFs included in the scheduled CC-U SFG is N (where N is a positive integer) and a first SF number included in the scheduled CC-U SFG is SF #n.

Method 1-2: M ($\leq$N) (where M is a positive integer) DL SF(s) of the scheduling CC, which are nearest to a corresponding SF, i.e. SF #n, among SF #(n−$m_{PUSCH}$) and SFs prior to SF #(n−$m_{PUSCH}$) may be configured as UL grant timings for N UL SF(s) of the scheduled CC in a scheduled CC-U SFG. UL grant timings for all or some UL SF(s) of the scheduled CC may be repeatedly configured in one DL SF of the scheduling CC. When M=N, N DL SF(s) of the scheduling CC may be linked to N UL SF(s) of the scheduled CC one by one.

Option 1 or Option 2 described in Method 1 of the present invention may be identically applied to the present Method 1-2.

Method 2-2: UL grant timings for M ($\leq$N) UL SF(s) of the scheduling CC, which are nearest to a corresponding SF, i.e. SF #n, among SF #n and SFs prior to SF #n may be configured as UL grant timing(s) of N UL SF(s) of the scheduled CC in a scheduled CC-U SFG. UL grant timings for all or some UL SF(s) of the scheduled CC may be repeatedly configured in one DL SF. When M=N, N DL SF(s) of the scheduling CC may be linked to N UL SF(s) of the scheduled CC in time order one by one.

Method 3-2: M ($\leq$N) DL SF(s) of the scheduling CC, which are nearest to SF #n among a UL grant timing of the scheduled CC, configured in a UL SF of the scheduled CC in SF #n, and SFs prior to the UL grant timing may be configured as UL grant timings of N UL SF(s) of the scheduled CC in a scheduled CC-U SFG. UL grant timing(s) for all or some UL SF(s) of the scheduled CC may be repeatedly configured in one DL SF of the scheduling CC. When M=N, N DL SF(s) of the scheduling CC may be linked to N UL SF(s) of the scheduled CC in time order one by one.

Option 1 or Option 2 described in Method 1 of the present invention may also be identically applied to Method 3-2 of the present invention.

In a DL SF of a scheduling CC, corresponding to a UL grant timing determined according to one of the above methods of the present invention, the UE blind-decodes a PDCCH search space in order to detect a PDCCH for the UE. The UE is configured to blind-decode both a search space for the scheduling CC and a search space of the scheduled CC in a DL SF of the scheduling CC corresponding to a UL grant timing for a UU SF. The UE is configured to blind-decode a search space for the scheduling CC in a DL SF of the scheduling CC corresponding to a UL grant timing for a UD SF and to blind-decode a search space for the scheduled CC in a DL SF of the scheduling CC corresponding to a UL grant timing for a DU SF.

<PHICH Timing>

Hereinafter, embodiments of the present invention of a DL ACK/NACK transmission/reception timing in a cross-CC scheduling situation of CCs having different DL-UL configurations will be described. In the embodiments of the present invention of the DL ACK/NACK transmission/reception timing, a PHICH timing for a specific UL SF of a specific CC refers to a DL SF of a CC configured to transmit/receive a PHICH for a PUSCH transmitted in a corresponding UL SF of the CC.

3. PHICH for PUSCH to be Transmitted in UU and UD

Figure 10:
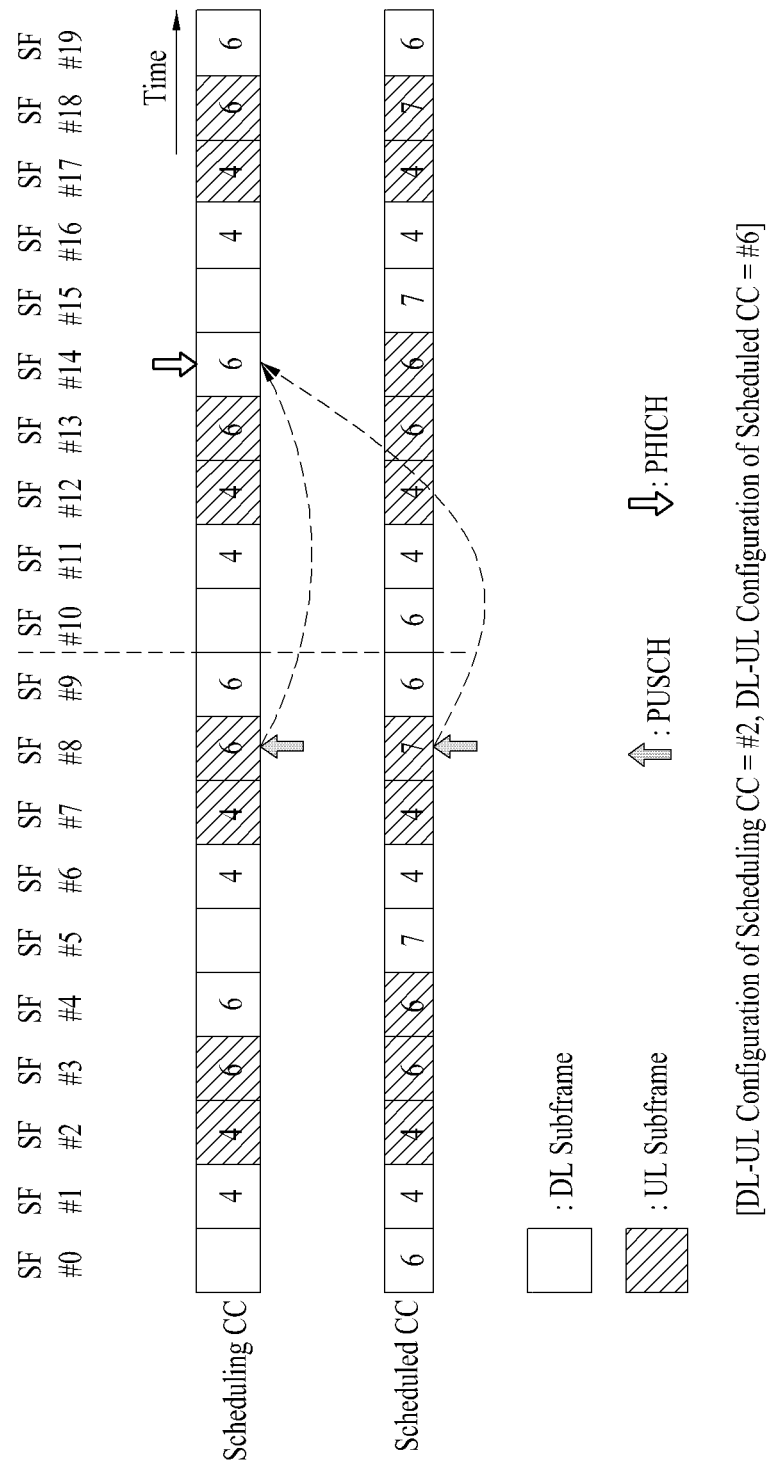
FIG. 10 illustrates an exemplary PHICH timing for PUSCH transmission in a UU SF.

FIG. 10 illustrates an exemplary PHICH timing for PUSCH transmission in a UU SF. Particularly, FIG. 10 illustrates a radio frame in which DL-UL configuration #1 of Table 1 is applied to a scheduling CC and DL-UL configuration #6 of Table 1 is applied to a scheduled CC. In FIG. 10, a number indicated in each UL SF represents a time point $k_{PHICH}$ at which a PHICH corresponding to a PUSCH in a corresponding UL SF is to be transmitted. Table 4 shows $k_{PHICH}$ in each TDD DL-UL configuration.

TABLE 4

| TDD UL-DL configuration | UL subframe number n | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | | 4 | 7 |

In Table 4, numbers defined in UL subframes in each DL-UL configuration correspond to $k_{PHICH}$. For example, referring to Table 4, $k_{PHICH}$ of a UL SF 2 in DL-UL configuration #2 is 6. For PUSCH transmission scheduled in an SF n, a UE determines a PHICH resource in an SF n+$k_{PHICH}$. That is, in FIG. 10, a number denoted in each UL SF corresponds to $k_{PHICH}$ of Table 4.

In Table 4, $k_{PHICH}$ defines a corresponding PHICH timing based on a UL SF in which a PUSCH is transmitted. $k_{PHICH}$ may be redefined as a new parameter (hereinafter, k) defining a corresponding PUSCH transmission timing based on a DL SF in which a PHICH is transmitted. Table 5 shows k in each TDD DL-UL configuration.

TABLE 5

| TDD DL-UL configuration | DL subframe number i | | | | | | | | | |
|---|---|---|---|---|---|---|---|---|---|---|
| | 0 | 1 | 2 | 3 | 4 | 5 | 6 | 7 | 8 | 9 |
| 0 | | 7 | 7 | | | | 7 | 4 | | |
| 1 | | | 4 | | | 6 | | | 4 | 6 |
| 2 | | | | 6 | | | | 6 | 6 | 6 |
| 3 | 6 | | | | | | | 6 | 6 | 6 |
| 4 | | | | | | | | 6 | 6 | 6 |
| 5 | | | | | | | | | 6 | |
| 6 | | 6 | 4 | | | | 7 | 4 | | 6 |

In Table 5, a number defined in a DL SF per DL-UL configuration corresponds to k. For example, referring to Table 5, k of a DL SF 3 in DL-UL configuration #2 is 6. ACK/NACK received on a PHICH allocated to a UE in an SF i is associated with PUSCH transmission in an SF i−k according to $k_{PHICHH}$ indicated by Table 4. For instance, the UE may transmit a PUSCH to the BS in a subframe i−k and receive a PHICH for the PUSCH from the BS in the subframe i. That is, in FIG. 10, a number denoted in each DL SF corresponds to k of Table 5.

Referring to Tables 4 and 5, the DL SF i of Table 5 corresponds to a DL SF n+$k_{PHICH}$ of Table 4 and a DL subframe i−k of Table 5 corresponds to a UL SF n of Table 4. That is, a number denoted in each DL SF corresponds to k of Table 5.

For reference, in FIG. 10, subframes of which subframe numbers has the same results when a modulo-10 operation is applied thereto have the same location in each radio frame comprised of 10 subframes.

Since a scheduling CC in a UU SF or UD SF basically includes a UL SF, a PHICH timing for the above SF is configured. Accordingly, a PHICH timing configured for a UL SF of the scheduling CC in a specific SF may be commonly applied to PHICH timings for a PUSCH of a scheduling CC and a PUSCH of a scheduled CC, transmitted in a specific SF configured with the UU or UD SF. That is, if the UL SF is configured on the scheduling CC in a specific SF, a PHICH for the PUSCH of the scheduled CC may be transmitted in a DL SF in which a PHICH for the PUSCH of the scheduling CC is transmitted.

Referring to FIG. 10, SF #2, SF #3, SF #7, SF #8, SF #12, SF #13, SF #17, and SF #18 correspond to UU SFs. For example, PHICHs for a PUSCH of the scheduling CC transmitted in SF #8 and/or a PUSCH of the scheduled CC transmitted in SF #8 may be transmitted through the scheduling CC in SF #14. In other words, the UE which has transmitted the PUSCH of the scheduling CC and the PUSCH of the scheduled CC in SF #8 may receive a PHICH for the PUSCH of the scheduling CC and a PHICH for the PUSCH of the scheduled CC in SF #14, which is the sixth SF ($k_{PHICH}$=6) after SF #8, from the BS. The UE and the BS may reconfigure $k_{PHICH}$ for a UL SF of the scheduled CC according to this embodiment. For example, referring to FIG. 10, the UE and the BS may reconfigure $k_{PHICH}$ for SF #8 of the scheduled CC as 6.

4. PHICH for PUSCH to be Transmitted in DU.

In a DU SF, since the scheduling CC does not include a UL SF unlike a UU SF or UD SF, a PHICH timing configured for the scheduling CC of the DU SF does not exist. Accordingly, a PHICH timing corresponding to the PUSCH of the sched-uling CC transmitted through the DU SF (i.e. SF #n) may be configured according to the following method.

Method 4: PHICH transmission/reception in a first DL SF of a scheduling CC among SF #(n+$m_{PHICH}$) or SFs after SF #(n+$m_{PHICH}$)

Here, $m_{PHICH}$ means a minimum SF interval (e.g. 4 SFs or 4 ms) between a PUSCH transmission timing and a PHICH timing. For example, if mPHICH is 4, the fourth SF after a UL SF in which a PUSCH is transmitted or an SF corresponding to 'UL SF, in which the PUSCH is transmitted, +4 ms' corresponds to an SF in which the PHICH can be transmitted.

Method 4 of the present invention has an advantage of minimizing latency from PUSCH transmission/reception to PHICH reception/transmission.

Figure 11:
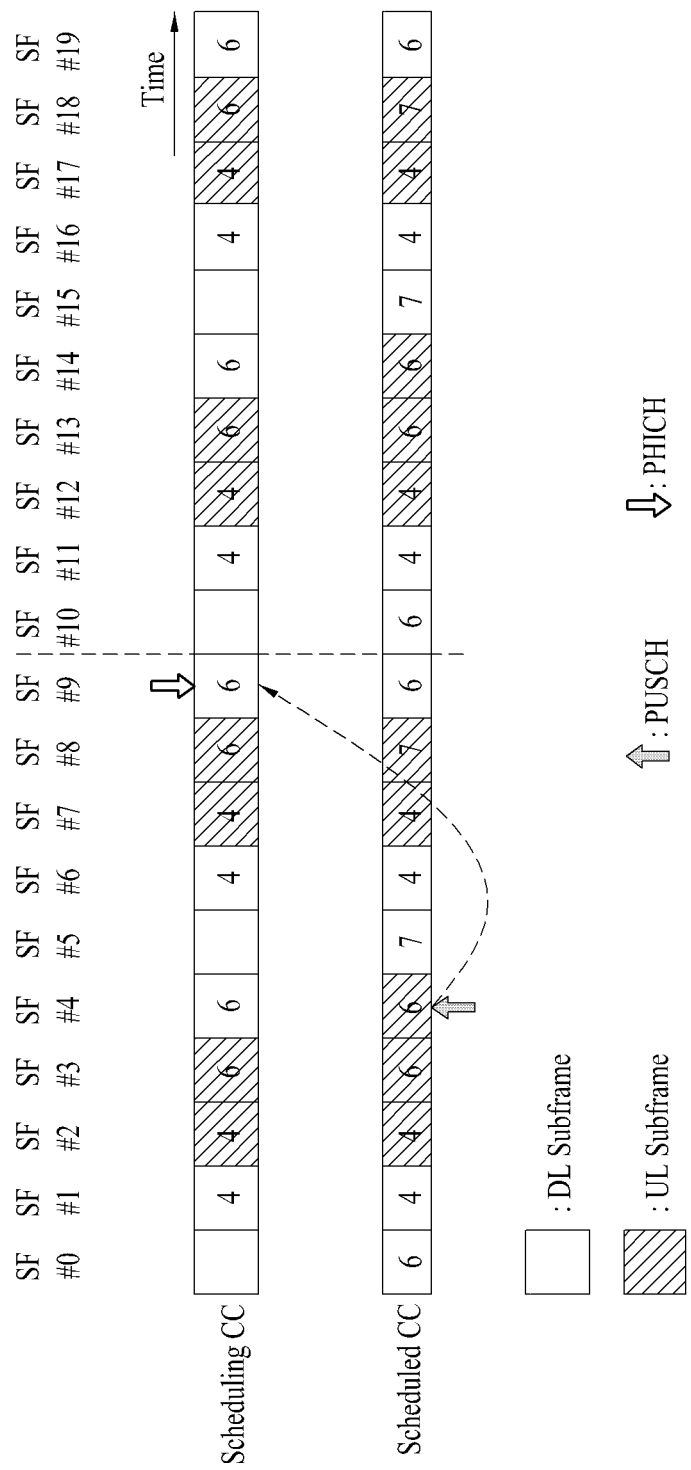
FIG. 11 illustrates a PHICH timing for PUSCH transmission in a DU SF according to Method 4 of the present invention.

FIG. 11 illustrates an exemplary PHICH timing for PUSCH transmission in a DU SF according to Method 4 of the present invention. Particularly, FIG. 11 illustrates an example of a PHICH grant timing for PUSCH transmission in a UL SF when Method 4 is applied in the case in which a scheduling CC and a scheduled CC operate in DL-UL configurations #1 and #6 of Table 1, respectively. In this case, $m_{PHICH}$ is assumed to be four SFs. In FIG. 11, a number denoted in each UL SF corresponds to $k_{PHICH}$ of Table 4 and a number denoted in each DL SF corresponds to k of Table 5.

Referring to FIG. 11, if a PHICH timing according to Method 4 of the present invention is applied to a PUSCH of a scheduled CC transmitted in SF #4, a PHICH for the PUSCH transmitted in SF #4 may be transmitted/received in the first DL SF of the scheduling CC among SF #(4+4) and SFs after SF #(4+4), i.e. in SF #9. The BS may transmit the PHICH for the PUSCH received through the scheduled CC in SF #4 to the UE in SF #9. The UE may transmit the PUSCH on the schduled CC in SF #4 and detect/receive the PHICH for the PUSCH in the first DL SF of the scheduled CC among SF #(4+4) and SFs after SF #(4+4), i.e., in SF #6. The UE and the BS may reconfigure $k_{PHICH}$ for a UL SF of the scheduled CC according to the present invention. For example, referring to FIG. 11, the UE and the BS may reconfigure $k_{PHICH}$ for SF #4 of the scheduled CC as 5.

Option 3: The first DL SF of the scheduling CC among SF #(n+$m_{PHICH}$) and SFs after SF #(n+$m_{PHICH}$) may be determined from among DL SFs configured such that a PHICH may be transmitted/received therein when only the scheduling CC operates as a single CC. That is, a PHICH timing of the present invention may be determined from among DL SF(s) in which PHICH resource(s) is/are reserved from among DL SFs of the scheduling CC because the PHICH regions/resource(s) may be cell-specifically configured/allocated. For example, in Table 5, DL SFs in which k is configured are DL SFs in which the PHICH resource is reserved. The UE attempts to detect/receive a PHICH not in all DL SFs but in DL SFs in which k is configured according to a corresponding DL-UL configuration. In this case, referring to FIG. 11, the first DL SF in which k is configured among SF #(4+4) and DL SFs of the scheduling CC after SF #(4+4) is SF #9 and a PHICH for a PUSCH of the scheduled CC transmitted in SF #4 is transmitted/received on the scheduling CC of SF #9.

Option 4: A first DL SF of a scheduling CC among SF #(n+$m_{PHICH}$) or SFs SF #(n+$m_{PHICH}$) may be determined among all DL SFs of the scheduling CC. Notably, although the PHICH timing is determined from among all DL SFs of the scheduling CC, the PHICH may not be transmitted/received in DL SFs in which the PHICH resource is not reserved, for example, in DL SFs without k in Table 5. According to the present invention, if the PHICH resource cannot be allocated to a DL SF configured as the PHICH timing, the BS does not transmit the PHICH in the DL SF. According to the present invention, if the PHICH resource is not present in a DL SF configured as the PHICH timing, the UE does not attempt to detect/receive the PHICH in the DL SF. In 3GPP LTE(-A), ACK/NACK for a PUSCH is signaled to the UE by two schemes. One scheme uses an ACK/NACK signal transmitted through a PHICH and the other scheme uses a New Data Indicator (NDI) transmitted through a PDCCH. Upon receiving NACK through the PHICH, the UE may recognize that the PUSCH has not been successfully received by the BS and retransmission of the PUSCH is needed. If an NDI in the PDCCH is toggled compared to a previous NDI, the UE recognizes that previous PUSCH transmission is successful and empties a buffer which has stored data packets corresponding to the PUSCH. On the other hand, the NDI in the PDCCH is not toggled compared to the previous NDI, the UE recognizes that previous PUSCH transmission fails and existing data needs to be retransmitted. Therefore, according to Option 4 of the present invention, if a UL grant demanding retransmission, i.e. a grant having an NDI not toggled, is not received, the UE does not perform retransmission of the previously transmitted PUSCH. In other words, the UE may perform retransmission for the previously transmitted PUSCH according to content included in the UL grant only when a UL grant demanding retransmission (UL grant including an NDI not toggled) is received.

Option 5: Similarly to Option 4, in Option 5, a PHICH timing is determined from among all DL SFs of the scheduling CC and a PHICH is not transmitted/received in DL SFs in which a PHICH resource is not reserved. However, in Option 5, adaptive retransmission according to an NDI configured in a UL grant is not performed. Instead, non-adaptive retransmission performed without the UL grant is performed. The following scheme may be considered so that a PUSCH of the scheduled CC may be retransmitted without the UL grant.

Alt 1: Method using UL Grant

If a UL grant is not received, the UE recognizes that a PUSCH of the scheduled CC is NACK and may retransmit the PUSCH. If a value explicitly indicating ACK (and/or NACK) information for a corresponding PUSCH is additionally inserted into the UL grant or if a specific field (or a combination of specific fields) in the UL grant is invalid or is configured as a predetermined value (or a combination of predetermined values) (and/or an NDI is not toggled), the UE may be configured to assume it as ACK for the PUSCH. Upon recognizing ACK, the UE may stop retransmission of the PUSCH. For example, upon receiving invalid resource allocation information and an NDI not toggled, the UE may recognize that the BS has successfully received the PUSCH of the scheduled CC and determines that the PUSCH does not need to be transmitted. Unlike Option 4, the UE assumes that PUSCH transmission of the scheduled CC is NACK until the UL grant is received.

Alt 2: Method using a Specific CCE Resource in PDCCH Region

An entire region in which a PDCCH is transmitted in each DL SF is comprised of a plurality of CCEs and a PDCCH transmitted to the UE is configured to include one or more CCEs. A specific CCE resource in a predesignated PDCCH region may be used for PHICH transmission/reception for the PUSCH of the scheduled CC. The CCE resource used for PHICH transmission/reception may be UE-specifically allocated through RRC or L1 or L2 signaling.

Figure 12:
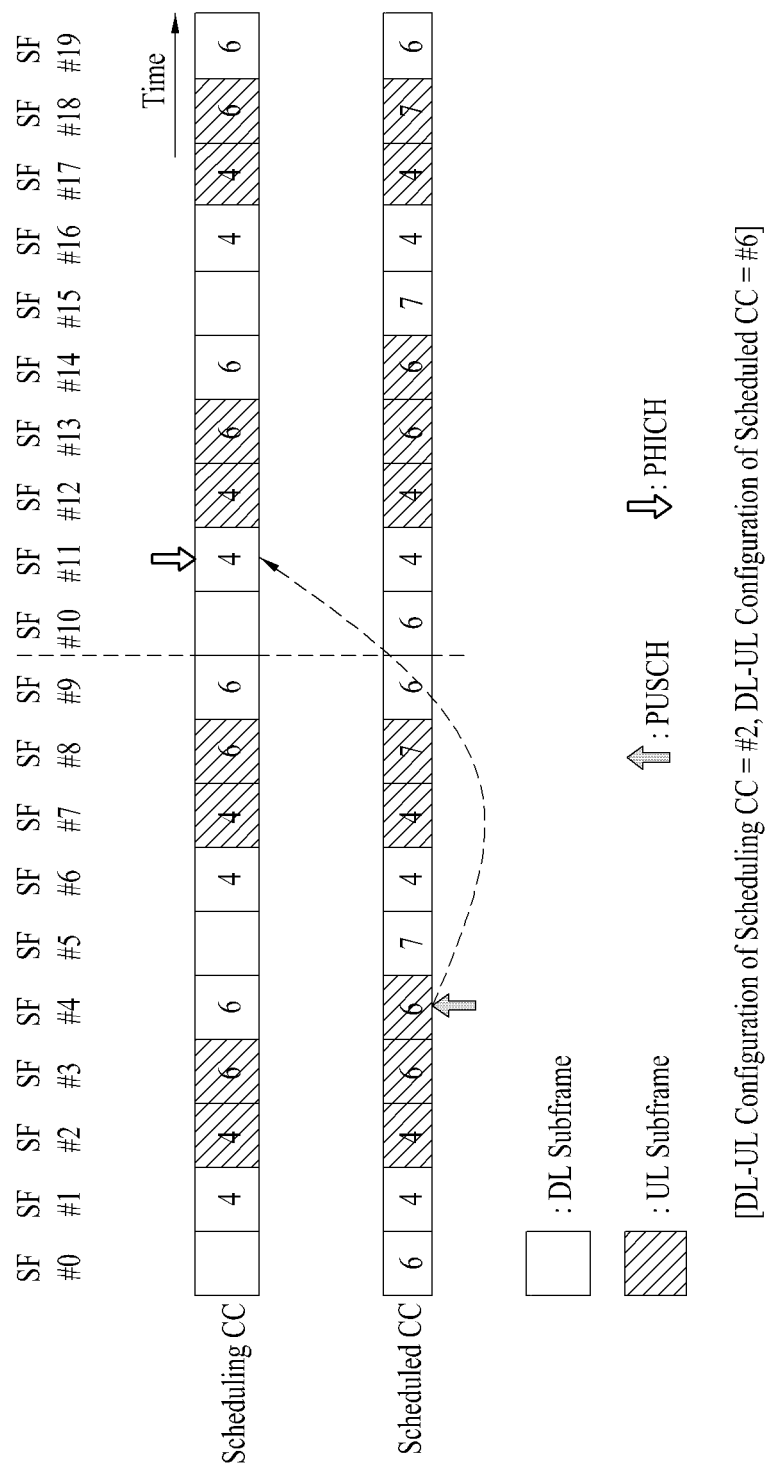
FIG. 12 illustrates an exemplary PHICH timing for PUSCH transmission in a DU SF according to Method 5 of the present invention.

Method 5: PHICH transmission/reception applying a PHICH timing for the first UL SF of a scheduling CC after SF #n FIG. 12 illustrates an exemplary PHICH timing for PUSCH transmission in a DU SF according to Method 5 of the present invention. Especially, FIG. 12 illustrates a PHICH timing for PUSCH transmission in a DU SF when Method 5 is applied in the case in which a scheduling CC and a scheduled CC operate in DL-UL configurations #1 and #6 of Table 1, respectively. In FIG. 12, a number indicated in each UL SF corresponds to $k_{PHICH}$ of Table 4 and a number indicated in a DL SF corresponds to k of Table 5.

Referring to FIG. 12, when a PHICH timing according to Method 4 of the present invention is applied to a PUSCH of the scheduled CC transmitted in SF #4, a PHICH timing for the first UL SF (i.e. SF #7) of the scheduling CC among SF #4 and SFs after SF #4 may be used as a PHICH timing for the scheduled CC of SF #4. The BS which has received a PUSCH through the scheduled CC in SF #4 transmits a PHICH for the PUSCH of the scheduled CC to the UE through the scheduling CC in SF #11 corresponding to SF #(7+$k_{PHICH}$) ($k_{PHICH}$ configured in SF #4 is 4). Since the PHICH timing for SF #7 of the scheduling CC is SF #(7+4) (=SF #11), the UE may detect/receive the PHICH for the PUSCH of the scheduled CC transmitted to the BS through the scheduling CC in SF #11.

Method 5 of the present invention is advantageous in that a DL SF for transmitting/receiving the PHICH for the scheduled CC is one of DL SFs configured to always transmit/receive the PHICH. That is, according to Method 4 of the present invention, the case does not occur in which a DL SF which is not configured to transmit/receive the PHICH is not configured, for example, a DL SF without k in Table 4, is determined as a DL SF for PHICH transmission/reception on the scheduled CC.

If Method 5 of the present invention is applied together with the PHICH timing configuration method for the scheduled CC to be transmitted in a UU SF, a PHICH timing for the scheduled CC in a specific SF may be determined based on the first UL SF of the scheduling CC among the specific SF and SFs after the specific SF. For example, referring to FIG. 12, a PHICH timing for the scheduled CC of SF #7 which is a UU SF may be determined based on the first UL SF among UL SFs of the scheduling CC including SF #7 and a PHICH timing for the scheduled CC of SF #4 which is a DU SF may also be determined based on the first UL SF among UL SFs of the scheduling CC including SF #7. In other words, PHICH timings for the scheduling CC and the scheduled CC may be determined by applying the same rule to the UU SF, UD SF, and DU SF.

Figure 13:
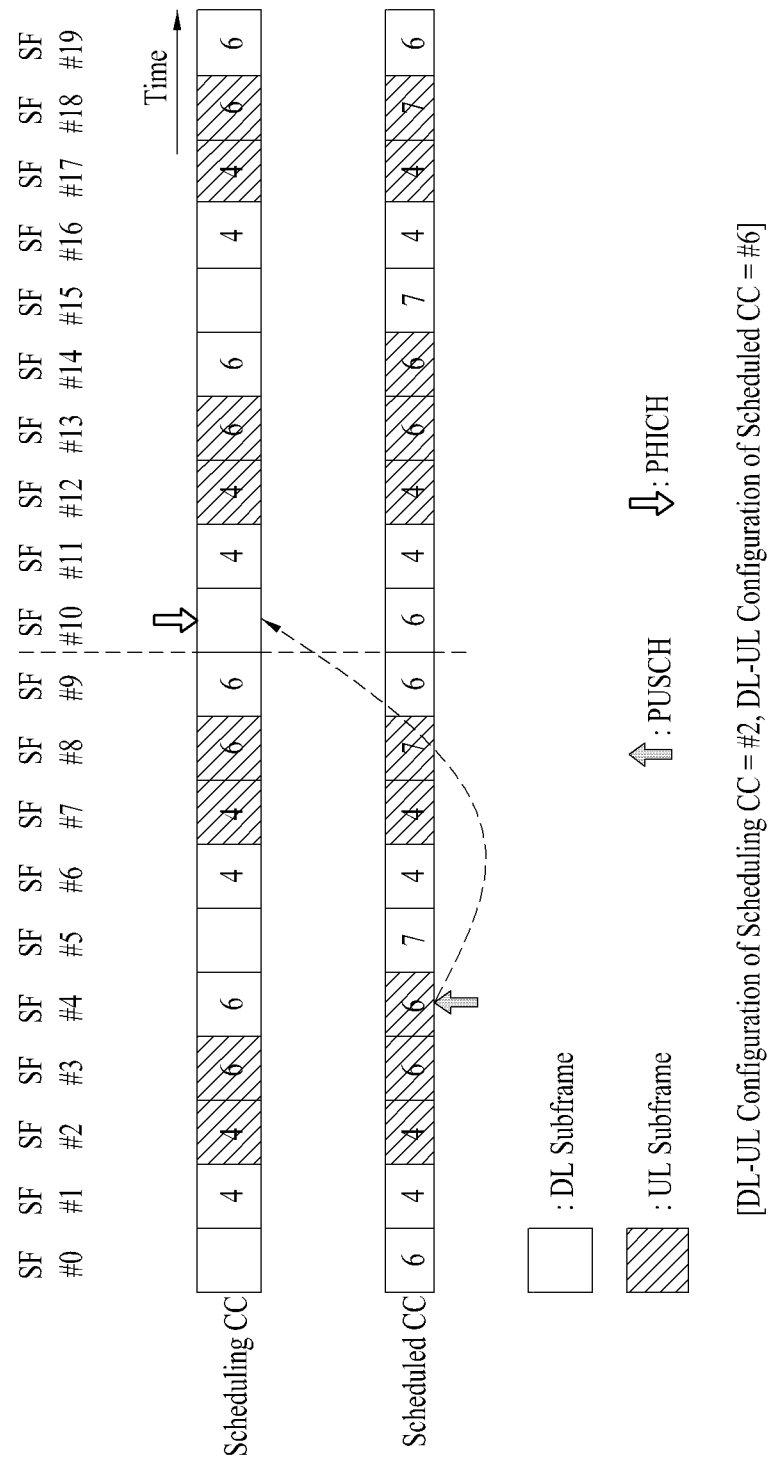
FIG. 13 illustrates an exemplary PHICH timing for PUSCH transmission in a DU SF according to Method 6 of the present invention.

Method 6: PHICH transmission/reception in the first DL SF of a scheduling CC among a PHICH timing for a UL SF of a scheduled CC in SF #n and SFs after the PHICH timing FIG. 13 illustrates an exemplary PHICH timing for PUSCH transmission in a DU SF according to Method 6 of the present invention. Especially, FIG. 13 illustrates a PHICH timing for PUSCH transmission in a DU SF when Method 6 is applied in the case in which a scheduling CC and a scheduled CC operate in DL-UL configurations #1 and #6 of Table 1, respectively. In FIG. 12, a number indicated in each UL SF corresponds to $k_{PHICH}$ of Table 4 and a number indicated in a DL SF corresponds to k of Table 5.

Referring to FIG. 13, if a PHICH timing according to Method 6 of the present invention is applied to a PUSCH of the scheduled CC transmitted in SF #4, a PHICH timing for a UL SF of the scheduled CC of SF #4, i.e. the first DL SF of the scheduling CC among SF #(4+6) (=SF #10) and SFs after SF #(4+6) may be used as a PHICH timing for the scheduled CC of SF #4. Namely, the PHICH for the scheduled CC of SF #4 may be transmitted/received through the scheduling CC in SF #10. Therefore, $k_{PHICH}$ for the UL SF of the scheduling CC in SF #4 may be reconfigured as 6.

Option 3, Option 4, or Option 5 described in Method 4 of the present invention may also be identically applied to Method 6 of the present invention.

Up to now, methods for configuring the PHICH timing for the scheduled CC based on an SF have been described. As another method, PHICH timing configuration methods for the scheduled CC based on a cell, i.e. a CC, will be described.

4. PHICH for PUSCH Transmission of Scheduling CC

For a PHICH for a PUSCH to be transmitted through the scheduling CC, a PHICH timing for a UL SF in which the PUSCH is transmitted is applied.

5. PHICH for PUSCH transmission of a scheduled CC

A UL grant timing for the PUSCH of the scheduled CC to be transmitted in SF #n may be configured according to any one of the following methods. $m_{PHICH}$ and $k_{PHICH}$ used in the above-described Method 4, Method 5, and Method 6 may have the same meaning in the following Method 4-1, Method 5-1, and Method 6-1. Method 4-1, Method 5-1, and Method 6-1 correspond to Method 4, Method 5, and Method 6, respectively, for configuring a UL grant timing for the scheduled CC based on an SF but differ in application criteria. Therefore, the UL grant timing for the scheduled CC configured according to Method 4/Method 5/Method 6 may be different from the UL grant timing for the scheduled CC configured according to Method 4-1/Method 5-1/Method 6-1.

Method 4-1: PHICH transmission/reception through a first DL SF of scheduling CC among SR #(n+$m_{PHICH}$) and SFs after SF #(n+$m_{PHICH}$)

Option 3, Option 4, or Option 5 described in Method 4 of the present invention may also be identically applied to Method 4-1 of the present invention.

Method 5-1: PHICH transmission/reception by applying a PHICH timing for the first UL SF of a scheduling CC among SF #n and SFs after SF #n Method 6-1: PHICH transmission/reception through the first DL SF of a scheduling CC among a PHICH timing of a scheduled CC configured in a UL SF of the scheduled CC in SF #n and SFs after the PHICH timing Option 3, Option 4, or Option 5 described in Method 4 of the present invention may also be identically applied to Method 4-1 of the present invention.

According to the above-described Method 4, Method 5, Method 6, Method 4-1, Method 5-1, and Method 6-1, the case in which the same PHICH timing, i.e. a multi-PHICH timing, is configured for UL SFs of a plurality of scheduled CCs may occur. That is, PHICHs for PUSCHs of the scheduled CC transmitted in different UL SFs may be configured to transmit/receive the same DL SF of the scheduling CC. Thus, when a plurality of PHICHs should be transmitted in one DL SF of one scheduling CC, modified forms of Method 4, Method 5, and Method 6 or Method 4-1, Method 5-1, and Method 6-1 may be applied in the unit of an SF group (i.e. scheduled CC-U SFG) consisting of consecutive UL SFs of the scheduled CC. It is assumed that the number of SFs included in the scheduled CC-U SFG is N (where N is a positive integer) and the last SF number included in the scheduled CC-U SFG is #n.

Method 4-2: First M(≤N) (where M is a positive integer) DL SF(s) of the scheduling CC among SF #(n+$m_{PHICH}$) and SFs after SF #(n+$m_{PHICH}$) may be configured as PHICH timing(s) for UL SF(s) in the scheduled CC-U SFG. PHICH timings for all or some UL SF(s) of the scheduled CC may be repeatedly configured in one DL SF of the scheduling CC. If M=N, N DL SF(s) of the scheduling CC may be linked to N UL SF(s) of the scheduled CC one by one in time order.

Option 3, Option 4, or Option 5 described in Method 4 of the present invention may also be identically applied to Method 4-2 of the present invention.

Method 5-2: First M (≤N) (where M is a positive integer) UL SFs of the scheduling CC among SF #n and SFs after SF #n may be configured as PHICH timing(s) for N UL SF(s) in the scheduled CC-U SFG. PHICH timings for all or some UL SFs of the scheduled CC may be configured in one DL SF. If M=N, N DL SF(s) of the scheduling CC may be linked to N UL SF(s) of the scheduled CC one by one in time order.

Method 6-2: First M(≤N) (where M is a positive integer) DL SFs of the scheduling CC among a PHICH timing of the scheduled CC configured in a UL SF of the scheduled CC in SF #n and DL SFs after the PHICH timing may be configured as UL grant timings for N UL SF(s) in the scheduled CC-U SFG. PHICH timing(s) for all or some UL SF(s) of the scheduled CC may be repeatedly configured in one DL SF of the scheduled CC. If M=N, N DL SF(s) of the scheduling CC may be linked to N UL SF(s) of the scheduled CC one by one in time order.

Option 3, Option 4, or Option 5 described in Method 4 of the present invention may also be identically applied to Method 6-2 of the present invention.

Meanwhile, a DL SF configured for transmission/reception of a PHICH for the scheduling CC operating as a single CC, for example, referring to Table 5, a DL SF in which k is configured, is assumed to be a PHICH-configured SF and a DL SF which does not correspond to the PHICH-configured SF is assumed to be a non-PHICH-configured SF. According to the above-described Method 4, Method 5, Method 6, Method 4-1, Method 5-1, Method 6-1, Method 4-2, Method 5-2, and Method 6-2, the non-PHICH-configured SF may be configured as a PHICH timing for a UL SF of a specific scheduled CC. If the non-PHICH-configured SF is configured as a PHICH timing, the method of omitting PHICH transmission/reception and retransmitting the PUSCH as in Option 4 or the method of omitting PHICH transmission/reception and non-adaptively retransmitting the PUSCH as in Option 5 may be applied.

<UL grant timing> and <PHICH timing> according to the proposed methods of the present invention may be simultaneously applied.

Figure 14:
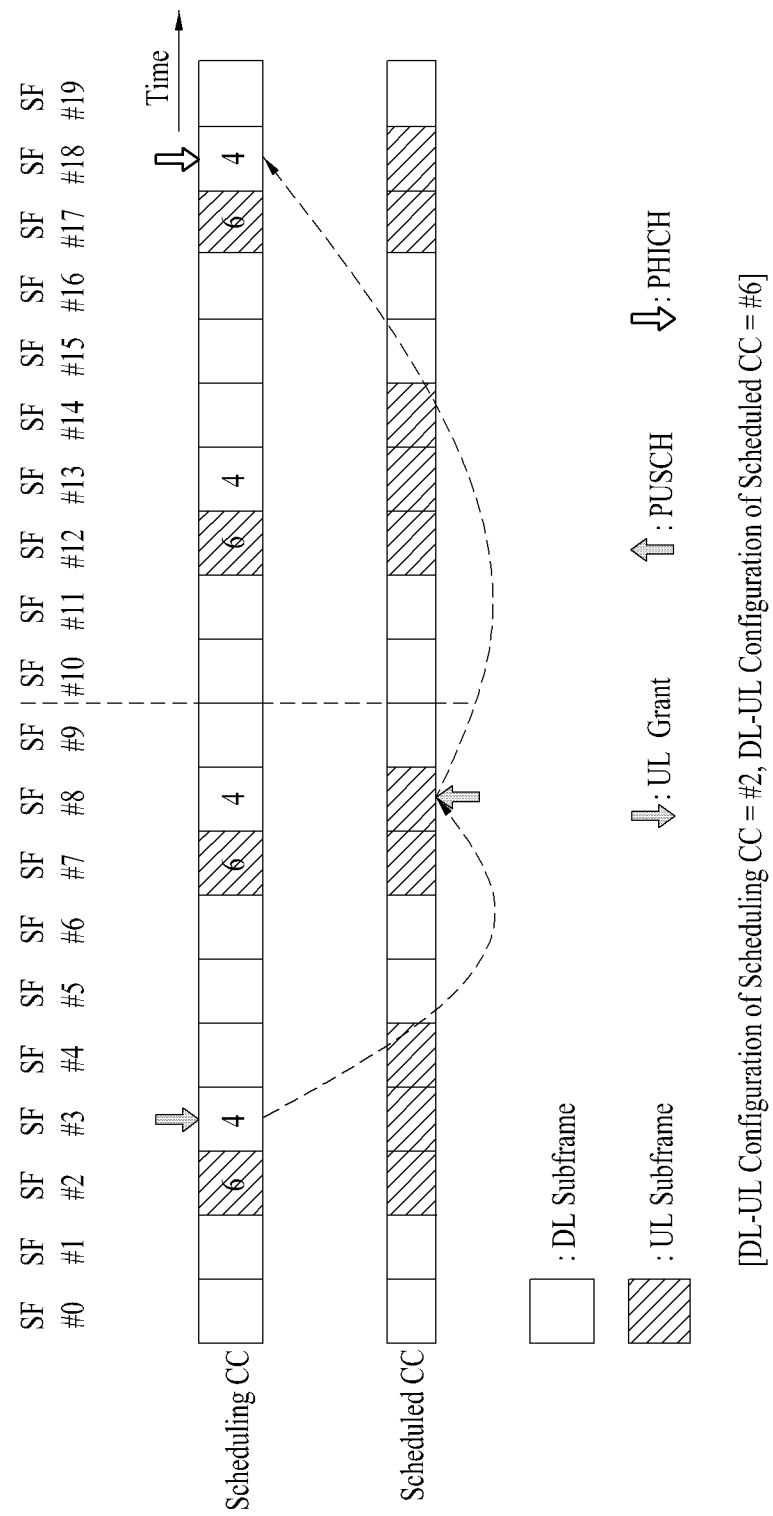
FIG. 14 illustrates an exemplary UL grant timing and a PHICH timing for PUSCH transmission in a DL SF according to the present invention.

FIG. 14 illustrates a UL grant timing and a PHICH timing for PUSCH transmission in a DL SF according to the present invention. Especially, FIG. 14 illustrates a UL grant timing and a PHICH timing for PUSCH transmission in a DU SF when Method 2 and Method 5 are applied in the case in which a scheduling CC and a scheduled CC operate in DL-UL configurations #2 and #6 of Table 1, respectively. In FIG. 14, a number indicated in each DL SF of the scheduling CC corresponds to kPHICH of Table 3 and a number indicated in a UL SF corresponds to $k_{PHICH}$ of Table 4.

Referring to FIG. 14, a UL grant for a PUSCH to be transmitted through the scheduled CC in SF #8 may be transmitted/received in a UL grant timing, SF #3, for a UL SF (SF #7) of the scheduling CC, which is nearest to SF #8 among SF #8 and SFs after SF #8, according to Method 2 of the present invention. A PHICH for the PUSCH transmitted to the BS through the scheduled CC in SF #8 may be transmitted/ received in a PHICH timing (SF #(12+6)=SF #18) for SF #12 which is the first UL SF of the scheduling CC among SF #8 and SFs after SF#8 according to Method 5 of the present invention.

Meanwhile, according to any one of the methods of the preset invention related to <UL grant timing>, a DL SF of the scheduling CC corresponding to a UL grant timing for the scheduled CC may be used to transmit/receive a PHICH for a PUSCH of the scheduled CC. Similarly, according to any one of the methods of the present invention related to <PHICH timing>, a DL SF of the scheduling CC corresponding to a PHICH timing for the scheduled CC may be used to transmit/receive a UL grant for the scheduled CC. For example, referring to FIG. 14, a PHICH for a PUSCH in SF #8 and a UL grant for retransmission of the PUSCH or a UL grant for transmission of a new PUSCH may be transmitted/received in a PHICH timing SF #18 configured according to Method 5 of the present invention. In addition, for a PUSCH to be transmitted in SF #8, a UL grant timing SF #3 configured according to Method 2 of the present invention may be used as a PHICH timing for a PUSCH transmitted to the BS in a previous frame.

On the other hand, the proposed methods of the present invention relates to <UL grant timing> and <PHICH timing> may be applied to each of a plurality of scheduled CCs having different DL-UL configurations. In other words, if plural scheduled CCs have different DL-UL configurations from a PCC, the above described methods of the present invention may be applied to respective scheduling and scheduled CCs. That is, if a scheduled CC has a different DL-UL configuration from a scheduling CC in terms of one scheduled CC, the proposed methods of the present invention may be applied.

Figure 15:
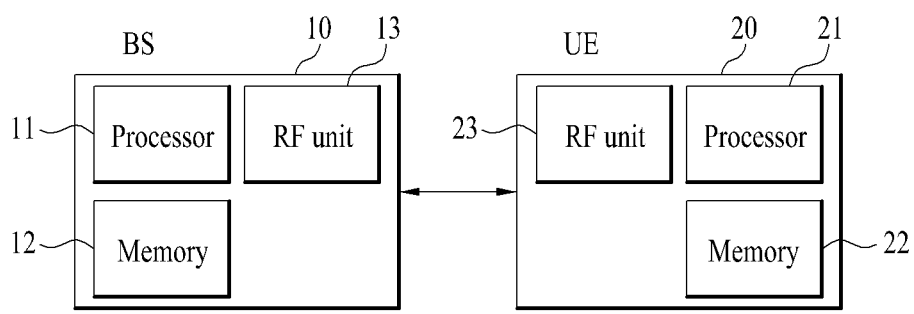
FIG. 15 is a block diagram illustrating elements of a BS 10 and a UE 20 by which the present invention is performed.

FIG. 15 is a block diagram illustrating elements of a BS 10 and a UE 20 by which the present invention is performed.

In the above-described methods of the present invention, the BS 10 may be a transmission entity of a PHICH and/or a UL grant and the UE 20 may be a transmission entity of a PUSCH. Therefore, the BS 10 may transmit a UL grant for a scheduling CC and/or a scheduled CC to the UE on the scheduling CC at a UL grant timing determined according to any one of the above methods of the present invention. To receive a PDCCH for the UE 20 at the UL grant timing determined according to any one of the above methods, the UE 20 blind-detects/decodes a corresponding search space of a PDCCH region of the scheduled CC. The UE 20 may receive the PDCCH and transmit a corresponding PUSCH to the BS 10 through the scheduling CC or the scheduled CC according to the UL grant carried on the PDCCH. The BS 10 may transmit a PHICH for the PUSCH received from the UE 20 through the scheduling CC and/or the scheduled CC to the UE 20 at a PHICH timing determined according to any one the above methods of the present invention. The UE 20 may detect/receive, on the scheduling CC at a PHICH timing determined according to any one the above methods of the present invention, the PHICH for the PUSCH transmitted to the BS 10 through the scheduling CC and/or the scheduled CC.

The BS 10 and the UE 20 respectively include Radio Frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so as to perform at least one of the above-described embodiments of the present invention.

The memories 12 and 22 may store programs for processing and controlling the processors 11 and 21 and may temporarily storing input/output information. The memories 12 and 22 may be used as buffers.

The processors 11 and 21 control the overall operation of various modules in the BS or UE. The processors 11 and 21 may perform various control functions to perform the present invention. The processors 11 and 21 may be referred to as controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present invention is implemented using firmware or software, the firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the BS codes and modulates signals and/or data scheduled by the processor 11 or a scheduler connected to the processor 11 to be transmitted to the exterior. The coded and modulated signals and/or data are transmitted to the RF unit 13. For example, the processor 11 converts a data stream to be transmitted into K layers through demultiplexing, channel coding, scrambling and modulation. The coded data stream is also referred to as a codeword and is equivalent to a transport block which is a data block provided by a Medium Access Control (MAC) layer. One Transport Block (TB) is coded into one codeword and each codeword is transmitted to the receiving device in the form of one or more layers. For frequency up-conversion, the RF unit 13 may include an oscillator. The RF unit 13 may include $N_t$ (where $N_t$ is a positive integer) transmit antennas. The processor 11 may determine a UL grant timing according to one method of the present invention. The RF unit 13 may transmit a UL grant for a scheduling CC or a scheduled CC to the UE 20 on the scheduling CC at the UL grant timing configured according to one method of the present invention, under the control of the processor 11. The RF unit 13 may receive a PUSCH scheduled on the scheduling CC or scheduled CC by the UL grant from the UE 20 through a corresponding CC in a UL SF associated with the UL grant timing. The processor 11 may configure/determine an SF, i.e. a PHICH timing, to transmit a PHICH carrying ACK/NACK for the PUSCH. The RF unit 13 may transmit the PHICH for the PUSCH to the UE through the scheduling CC in the PHICH timing configured/determined according to one method of the present invention, under the control of the processor 11.

A signal processing process of the UE 20 is the reverse of the signal processing process of the BS 10. Under control of the processor 21, the RF unit 23 of the UE 10 receives radio signals transmitted by the BS 10. The RF unit 23 may include $N_r$ receive antennas and frequency down-converts each of signals received through receive antennas into a baseband signal. The processor 21 decodes and demodulates the radio signals received through the receive antennas and restores data that the BS 10 originally desired to transmit to the UE. The processor 21 may control the RF unit 23 so that the PUSCH scheduled in the scheduling CC or the scheduled CC by the UL grant through the scheduling CC may be transmitted to the BS 10 through a corresponding CC in a UL SF associated with the UL grant timing configured/determined according to one method of the present invention. The processor 21 may control the RF unit 23 so that the PHICH for the PUSCH may be received from the BS through the scheduling CC in the PHICH timing configured/determined according to one method of the present invention.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. A signal transmitted through each antenna cannot be decomposed by the UE 20. A Reference Signal (RS) transmitted in correspondence to a corresponding antenna defines an antenna viewed from the UE 20 and enables the UE 20 to perform channel estimation for the antenna, irrespective of whether a channel is a single radio channel from one physical channel or a composite channel from a plurality of physical antennas including the antenna. That is, an antenna is defined such that a channel for transmitting a symbol on the antenna can be derived from the channel through which another symbol on the same antenna is transmitted. An RF unit supporting a Multi-Input Multi-Output (MIMO) function of transmitting and receiving data using a plurality of antennas may be connected to two or more antennas.

The detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The present invention is applicable to a BS, a UE, or other equipment in a wireless communication system.

The invention claimed is:

1. A method for receiving downlink control information from a base station at a user equipment in which a plurality of cells is configured, comprising:
receiving downlink control information for an uplink data channel to be transmitted in an uplink subframe $U_2$ of a second cell among the plurality of cells from the base station in a downlink subframe $D_1$ of a first cell among the plurality of cells; and
transmitting the uplink data channel to the base station in the uplink subframe $U_2$ according to the downlink control information,
wherein the first cell and the second cell have different time division duplex (TDD) downlink-uplink configurations, and
wherein the downlink subframe $D_1$ is a subframe configured for transmission of downlink control information for an uplink subframe $U_1$ of the first cell (where $D_1$, $U_1$, and $U_2$ are non-negative integers), and the uplink subframe $U_1$ is an uplink subframe which is the nearest to the uplink subframe $U_2$ among an uplink subframe of the first cell, which coincides with the uplink subframe $U_2$, and uplink subframes of the first cell, which are prior to the uplink subframe $U_2$.

2. The method according to claim 1, wherein:
the uplink subframe $U_1$ of the first cell is an uplink subframe of the first cell which is the nearest to the uplink subframe $U_2$ among the uplink subframes prior to the uplink subframe $U_2$ of the second cell when a subframe of the first cell corresponding to the uplink subframe $U_2$ of the second cell acts as downlink, and
the uplink subframe $U_1$ of the first cell is a subframe sharing a same time resource as the uplink subframe $U_2$ when the subframe of the first cell corresponding to the uplink subframe $U_2$ of the second cell acts as uplink.

3. The method according to claim 1, wherein the downlink control information for the uplink data channel to be transmitted in the uplink subframe $U_2$ includes information indicating the uplink subframe $U_2$.

4. The method according to claim 1, further comprising:
receiving downlink control information for N uplink subframes of the second cell from the base station in downlink subframes of the first cell, configured for transmission of downlink control information for M uplink subframes of the first cell which are the nearest to the uplink subframe $U_2$ among the uplink subframe of the first cell, which coincides with the uplink subframe $U_2$, and the uplink subframes of the first cell, which are prior to the uplink subframe $U_2$, where M and N are positive integers, and N is the number of consecutive uplink subframes of the second cell, and M≤N.

5. A method for transmitting downlink control information at a base station to a user equipment in which a plurality of cells is configured, comprising:
transmitting downlink control information for an uplink data channel to be transmitted in an uplink subframe $U_2$ of a second cell among the plurality of cells to the user equipment in a downlink subframe $D_1$ of a first cell among the plurality of cells; and
receiving the uplink data channel from the user equipment in the uplink subframe $U_2$ according to the downlink control information,
wherein the first cell and the second cell have different time division duplex (TDD) configurations, and
wherein the downlink subframe $D_1$ is a subframe configured for transmission of downlink control information for an uplink subframe $U_1$ of the first cell (where $D_1$, $U_1$, and $U_2$ are non-negative integers), and the uplink subframe $U_1$ is an uplink subframe which is the nearest to the uplink subframe $U_2$ among an uplink subframe of the first cell, which coincides with the uplink subframe $U_2$, and uplink subframes of the first cell, which are prior to the uplink subframe $U_2$.

6. The method according to claim 5, wherein:
the uplink subframe $U_1$ of the first cell is an uplink subframe of the first cell which is the nearest to the uplink subframe $U_2$ among the uplink subframes prior to the uplink subframe $U_2$ of the second cell when a subframe of the first cell corresponding to the uplink subframe $U_2$ of the second cell acts as downlink, and
the uplink subframe $U_1$ of the first cell is a subframe sharing a same time resource as the uplink subframe $U_2$ when the subframe of the first cell corresponding to the uplink subframe $U_2$ of the second cell acts as uplink.

7. The method according to claim 5, wherein the downlink control information for the uplink data channel to be transmitted in the uplink subframe $U_2$ includes information indicating the uplink subframe $U_2$.

8. The method according to claim 5, further comprising: transmitting downlink control information for N uplink subframes of the second cell to the user equipment in downlink subframes of the first cell, configured for transmission of downlink control information for M uplink subframes of the first cell which are the nearest to the uplink subframe $U_2$ among the uplink subframe of the first cell, which coincides with the uplink subframe $U_2$, and the uplink subframes of the first cell, which are prior to the uplink subframe $U_2$, where M and N are positive integers, and N is the number of consecutive uplink subframes of the second cell, and M≤N.

9. A user equipment, in which a plurality of cells is configured, for receiving downlink control information from a base station, comprising:
a Radio Frequency (RF) unit configured to transmit and receive a radio signal; and
a processor configured to control the RF unit,
wherein the processor controls the RF unit to receive downlink control information for an uplink data channel to be transmitted in an uplink subframe $U_2$ of a second cell among the plurality of cells from the base station in a downlink subframe $D_1$ of a first cell among the plurality of cells and controls the RF unit to transmit the uplink data channel to the base station in the uplink subframe $U_2$ according to the downlink control information,
wherein the first cell and the second cell have different time division duplex (TDD) configurations, and
wherein the downlink subframe $D_1$ is a subframe configured for transmission of downlink control information for an uplink subframe $U_1$ of the first cell (where $D_1$, $U_1$, and $U_2$ are non-negative integers), and the uplink subframe $U_1$ is an uplink subframe which is the nearest to the uplink subframe $U_2$ among an uplink subframe of the first cell, which coincides with the uplink subframe $U_2$, and uplink subframes of the first cell, which are prior to the uplink subframe $U_2$.

10. The user equipment according to claim 9, wherein the downlink control information for the uplink data channel to be transmitted in the uplink subframe $U_2$ includes information indicating the uplink subframe $U_2$.

11. The user equipment according to claim 9, wherein the processor controls the RF unit to receive downlink control information for N uplink subframes of the second cell from the base station in downlink subframes of the first cell, configured for transmission of downlink control information for M uplink subframes of the first cell which are the nearest to the uplink subframe $U_2$ among the uplink subframe of the first cell, which coincides with the uplink subframe $U_2$, and the uplink subframes of the first cell, which are prior to the uplink subframe $U_2$, where M and N are positive integers, and N is the number of consecutive uplink subframes of the second cell, and M≤N.

12. A base station for transmitting downlink control information to a user equipment in which a plurality of cells is configured, comprising:
a Radio Frequency (RF) unit configured to transmit and receive a radio signal; and
a processor configured to control the RF unit,
wherein the processor controls the RF unit to transmit downlink control information for an uplink data channel to be transmitted in an uplink subframe $U_2$ of a second cell among the plurality of cells to the user equipment in a downlink subframe $D_1$ of a first cell among the plurality of cells and controls the RF unit to receive the uplink data channel from the user equipment in the uplink subframe $U_2$ according to the downlink control information,
wherein the first cell and the second cell have different time division duplex (TDD) configurations, and
wherein the downlink subframe $D_1$ is a subframe configured for transmission of downlink control information for an uplink subframe $U_1$ of the first cell (where $D_1$, $U_1$, and $U_2$ are non-negative integers), and the uplink subframe $U_1$ is an uplink subframe which is the nearest to the uplink subframe $U_2$ among an uplink subframe of the first cell, which coincides with the uplink subframe $U_2$, and uplink subframes of the first cell, which are prior to the uplink subframe $U_2$.

13. The base station according to claim 12, wherein the downlink control information for the uplink data channel to be transmitted in the uplink subframe $U_2$ includes information indicating the uplink subframe $U_2$.

14. The base station according to claim 12, wherein the processor controls the RF unit to transmit downlink control information for N uplink subframes of the second cell to the user equipment in downlink subframes of the first cell, configured for transmission of downlink control information for M uplink subframes of the first cell which are the nearest to the uplink subframe $U_2$ the uplink subframe of the first cell, which coincides with the uplink subframe $U_2$, and the uplink subframes of the first cell, which are prior to the uplink subframe $U_2$, where M and N are positive integers, and N is the number of consecutive uplink subframes of the second cell, and M≤N.

* * * * *